United States Patent
Sase et al.

(10) Patent No.: US 9,482,801 B2
(45) Date of Patent: Nov. 1, 2016

(54) METHOD FOR PRODUCING LONG CIRCULAR POLARIZATION PLATE AND LONG CIRCULAR POLARIZATION PLATE

(71) Applicant: SUMITOMO CHEMICAL COMPANY, LIMITED, Chuo-ku, Tokyo (JP)

(72) Inventors: Mitsutaka Sase, Niihama (JP); Nobuyuki Hatanaka, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/454,392

(22) Filed: Aug. 7, 2014

(65) Prior Publication Data
US 2015/0043073 A1  Feb. 12, 2015

(30) Foreign Application Priority Data

Aug. 9, 2013  (JP) .................. 2013-165940

(51) Int. Cl.
G02B 5/30 (2006.01)
G02B 1/12 (2006.01)
G02B 1/08 (2006.01)

(52) U.S. Cl.
CPC ............. *G02B 5/3016* (2013.01); *G02B 1/08* (2013.01); *G02B 1/12* (2013.01); *G02B 5/305* (2013.01); *G02B 5/3083* (2013.01); *Y10T 83/04* (2015.04)

(58) Field of Classification Search
CPC  G02B 5/3033; G02B 5/3083; G02B 5/3016; G02B 5/305; G02B 1/08; G02B 1/12
USPC .......... 427/162, 163.1, 541; 264/1.34; 359/487.02, 489.07, 900
See application file for complete search history.

(56) References Cited

U.S. PATENT DOCUMENTS

| | | | | |
|---|---|---|---|---|
| 6,400,433 B1* | 6/2002 | Arakawa | ............. | G02B 5/3016 349/117 |
| 7,136,225 B2 | 11/2006 | Matsumoto et al. | | |
| 7,320,812 B2* | 1/2008 | Masuda | ................ | C09K 11/06 349/123 |
| 7,852,561 B2* | 12/2010 | Chiba | ................. | G02B 5/3033 349/119 |
| 2006/0232733 A1* | 10/2006 | Shibazaki | ............ | G02F 1/1393 349/117 |
| 2007/0054066 A1* | 3/2007 | Usukura | ............. | G02B 5/3083 428/1.31 |
| 2007/0128382 A1* | 6/2007 | Hayashi | ............... | G02B 5/3016 428/1.31 |
| 2010/0068419 A1* | 3/2010 | Kim | ..................... | G02B 5/3016 428/1.23 |
| 2012/0008224 A1 | 1/2012 | Uchida | | |
| 2013/0235457 A1* | 9/2013 | Matsuda | ............. | G02B 5/3016 359/485.01 |
| 2015/0226895 A1* | 8/2015 | Hatanaka | ............ | G02B 5/3041 359/487.02 |

FOREIGN PATENT DOCUMENTS

| | | | |
|---|---|---|---|
| JP | 10-300926 A | 11/1998 | |
| JP | 3708062 B2 | 10/2005 | |
| JP | 2006-337892 A | 12/2006 | |

(Continued)

OTHER PUBLICATIONS

"Liquid Crystal Device Handbook", Chapter 3, 4-3, Chiral Agents for TN and STN, p. 199, edited by Japan Society for the Promotion of Science, 142 Committee, 1989.

(Continued)

*Primary Examiner* — Ricky D Shafer
(74) *Attorney, Agent, or Firm* — Sughrue Mion, PLLC

(57) ABSTRACT

A production method for producing a thin circularly polarizing plate at a high productivity is provided.

6 Claims, 1 Drawing Sheet

(56) References Cited

FOREIGN PATENT DOCUMENTS

| JP | 2009-251288 | * | 10/2009 |
| JP | 4432487 B2 | | 3/2010 |
| JP | 2011-207765 A | | 10/2011 |
| JP | 2012-33249 A | | 2/2012 |
| JP | 2013033249 | * | 2/2013 |

OTHER PUBLICATIONS

"Handbook of Liquid Crystals", Chapter 3.8.6. Network (Fully Cross-Linked), 6.5.1. Liquid Crystal Material, b. Polymerizable Nematic Liquid Crystal Material, edited by Ekisho Binran Henshu linkai, Maruzen, Oct. 30, 2000.

* cited by examiner

METHOD FOR PRODUCING LONG CIRCULAR POLARIZATION PLATE AND LONG CIRCULAR POLARIZATION PLATE

CROSS REFERENCE TO RELATED APPLICATIONS

This application claims priority based on Japanese Patent Application No. 2013-165940, filed Aug. 9, 2013, the contents of which is incorporated herein by reference in its entirety.

BACKGROUND OF THE INVENTION

1. Field of the Invention

The present invention relates to a method for producing a long circularly polarizing plate and to a long circularly polarizing plate.

2. Description of the Related Art

A liquid crystal display device is known having a wide-band circularly polarizing plate in which a polarizing film made of polyvinyl alcohol dyed with iodine, a half-wave plate, and quarter-wave plate are stacked.

In such a wide-band circularly polarizing plate, it is necessary to stack these by shifting the angle formed by the slow axis of the half-wave plate and the absorption axis of the polarizing film and the angle formed by the slow axis of the quarter-wave plate and the absorption axis of the polarizing film each by 15° or 75°, making it difficult to fabricate the circularly polarizing plate by roll-to-roll bonding. On the other hand, thickness reduction of the display device is strongly demanded and, for this reason, thickness reduction or the circularly polarizing plate is also demanded.

JP-A-2006-337892 discloses a circularly polarizing plate having a thickness of 130 to 370 μm in which a reverse wavelength dispersive film and a polarizing plate obtained by applying a dichroic dye are stacked on a retardation layer.

However, in the circularly polarizing plate disclosed in JP-A-2006-337892, the two films are stacked via a pressure-sensitive adhesive agent or an adhesive agent so that the absorption axis of the polarizing plate and the slow axis of the retardation plate may form an angle of 45°, so that the thickness of the circularly polarizing plate and the convenience of the production steps have not been sufficient.

SUMMARY OF THE INVENTION

The present invention includes the following aspects.

[1] A method for producing a long circularly polarizing plate, including, in this order;

(1) continuously applying an optical alignment membrane forming composition onto a long polarizing plate to form a first application membrane on the long polarizing plate;

(2) drying the first application membrane to form a first dried coating membrane;

(3) radiating a polarized light which is polarized in an oblique direction relative to a length direction of the long polarizing plate, onto the first dried coating membrane, so as to form a long optical alignment membrane in which a direction of an alignment restricting force is oblique relative to the length direction of the long polarizing plate;

(4) continuously applying onto the long optical alignment membrane a liquid crystal cured membrane forming composition containing a polymerizable liquid crystal compound (A), so as to form a second application membrane on the long optical alignment membrane;

(5) drying the second application membrane to form a second dried coating membrane; and (6) curing the second dried coating membrane to form a long retardation membrane.

[2] The method for producing a long circularly polarizing plate according to [1], wherein a temperature for drying the first application membrane is lower than 120° C.

[3] The method for producing a long circularly polarizing plate according to [1] or [2], wherein a temperature for drying the second application membrane is lower than 120° C.

[4] The method for producing a long circularly polarizing plate according to anyone of [1] to [3], wherein the polymerizable liquid crystal compound (A) is a compound represented by the following formula (A):

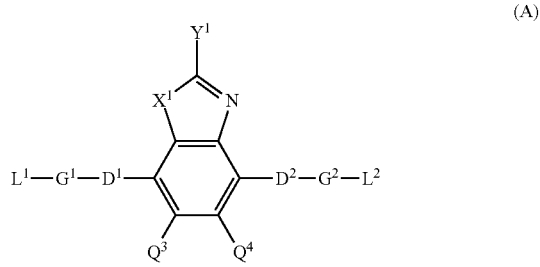

[$X^1$ represents an oxygen atom, a sulfur atom, or $NR^1$—; $R^1$ represents a hydrogen atom or an alkyl group having a carbon number of 1 to 4;

$Y^1$ represents a monovalent aromatic hydrocarbon group having a carbon number of 6 to 12 and optionally having a substituent or a monovalent aromatic heterocyclic group having a carbon number of 3 to 12 and optionally having a substituent;

$Q^3$ and $Q^4$ each independently represent a hydrogen atom, a monovalent aliphatic hydrocarbon group having a carbon number of 1 to 20 and optionally having a substituent, a monovalent alicyclic hydrocarbon group having a carbon number of 3 to 20, a monovalent aromatic hydrocarbon group having a carbon number of 6 to 20 and optionally having a substituent, a halogen atom, a cyano group, a nitro group, —$NR^2R^3$, or —$SR^2$, or $Q^3$ and $Q^4$ are bonded with each other to form an aromatic ring or an aromatic heterocyclic ring together with carbon atoms to which these are bonded; $R^2$ and $R^3$ each independently represent a hydrogen atom or an alkyl group having a carbon number of 1 to 6;

$D^1$ and $D^2$ each independently represent a single bond, —C(=O)—O—, —C(=S)—O—, —$CR^4R^5$—, —$CR^4R^5$—$CR^6R^7$—, —O—$CR^4R^5$—, —$CR^4R^5$—O—$CR^6R^7$—, —CO—O—$CR^4R^5$—, —O—CO—$CR^4R^5$—, —$CR^4R^5$—O—CO—$CR^6R^7$—, —$CR^4R^5$—CO—O—$CR^6R^7$—, $NR^4$—$CR^5R^6$—, or CO—$NR^4$—;

$R^4$, $R^5$, $R^6$, and $R^7$ each independently represent a hydrogen atom, a fluorine atom, or an alkyl group having a carbon number of 1 to 4;

$G^1$ and $G^2$ each independently represent a divalent alicyclic hydrocarbon group having a carbon number of 5 to 8, where a methylene group constituting the alicyclic hydrocarbon group may be substituted with an oxygen atom, a sulfur atom, or NH—, and a methine group constituting the alicyclic hydrocarbon group may be substituted with a tertiary nitrogen atom; and $L^1$ and $L^2$ each independently represent a monovalent organic group, where at least one of $L^1$ and $L^2$ has a polymerizable group].

[5] The method for producing a long circularly polarizing plate according to any one of [1] to [4], wherein the long polarizing plate includes a film obtained by orientation of polyvinyl alcohol dyed with iodine.

[6] The method for producing a long circularly polarizing plate according to any one of [1] to [4], wherein the long polarizing plate includes a film obtained by polymerizing a composition containing a dye and a polymerizable liquid crystal compound (B).

[7] The method for producing a long circularly polarizing plate according to [6], wherein the polymerizable liquid crystal compound (B) is a polymerizable liquid crystal compound having a smectic liquid crystallinity.

[8] A long circularly polarizing plate including a long polarizing plate, a long optical alignment membrane, and a long retardation membrane in this order, wherein a direction of an alignment restricting force of the long optical alignment membrane is oblique relative to a length direction of the long polarizing plate, a thickness of the long retardation membrane is 3 μm or less, and a direction of an optical axis of the long retardation membrane is oblique relative to the length direction of the long polarizing plate.

[9] The long circularly polarizing plate according to [8], wherein a wavelength dispersion property of the long retardation membrane satisfies the following formula (3):

$$100 < Re(550) < 160 \quad (3)$$

wherein, in the formula. $Re(\lambda)$ represents an in-plane retardation value relative to a light having a wavelength of λ nm.

[10] The long circularly polarizing plate according to [8] or [9], having a wavelength dispersion property satisfying the following formulas (1) and (2):

$$Re(450)/Re(550) \le 1.00 \quad (1)$$

$$1.00 \le Re(650)/Re(550) \quad (2)$$

wherein, in the formulas, $Re(\lambda)$ represents an in-plane retardation value relative to a light having a wavelength of λ nm.

[11] A method for producing a circularly polarizing plate, wherein a long circularly polarizing plate according to any one of [8] to [10] is cut into pieces.

[12] A circularly polarizing plate obtained by a production method according to [11].

According to the present invention, a thin circularly polarizing plate can be produced at a high productivity.

DETAILED DESCRIPTION OF THE PREFERRED EMBODIMENTS

<Long Polarizing Plate>

Figure 1:
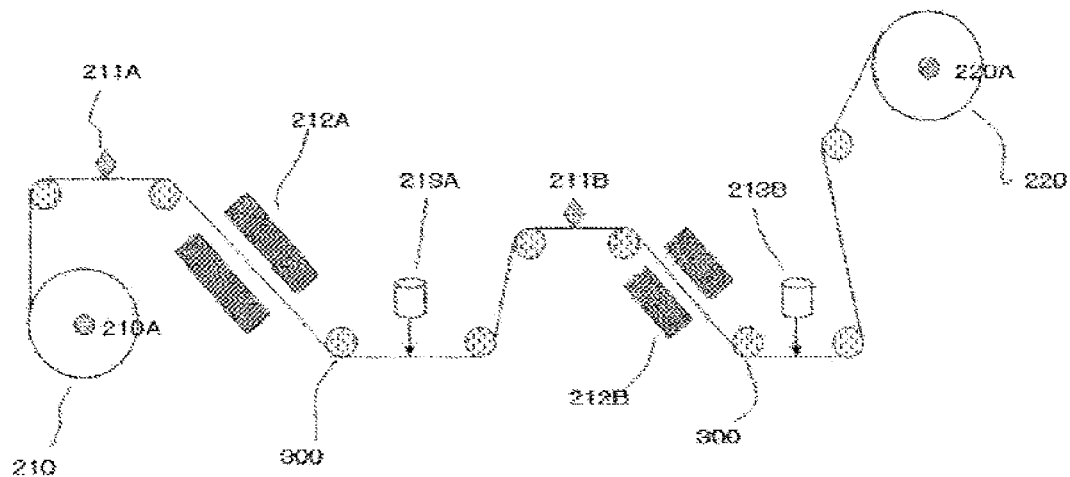
FIG. 1 is a model view illustrating an essential part of a continuous production method (roll-to-roll form) for producing a long circularly polarizing plate.

A long polarizing plate typically has an absorption axis parallel to the length direction or the lateral direction.

The long polarizing plate may be, for example, one including a film obtained by orientation of polyvinyl alcohol dyed with iodine, a film obtained by polymerization of a composition containing a dye and a polymerizable liquid crystal compound (B), or the like.

The film obtained by orientation of polyvinyl alcohol dyed with iodine and the film obtained by polymerization of a composition containing a dye and a polymerizable liquid crystal compound (B) preferably have a substrate on one surface or on both surfaces thereof. The substrate may be, for example, a plastic substrate. Examples of the plastic constituting the plastic substrate include polyolefins such as polyethylene, polypropylene, and norbornene-based polymers; cyclic olefin-based resins; polyvinyl alcohol; polyethylene terephthalate; polymethacrylate; polyacrylate; cellulose esters such as triacetylcellulose, diacetylcellulose, and cellulose acetate propionate; polyethylene naphthalate; polycarbonate; polysulfone; polyethersulfone; polyetherketone; polyphenylene sulfide; and polyphenylene oxide. The plastic is preferably a cellulose ester, a cyclic olefin-based resin, polycarbonate, polyethyleneterephthalate, and polymethacrylate.

The substrate on the surface on which the optical alignment membrane forming composition is applied is preferably a cycloolefin-based resin, polycarbonate, polyethylene terephthalate, or polymethacrylate. These substrates are preferable because of having a high solvent resistance to the solvent contained in the optical alignment membrane forming composition.

The long polarizing plate including a film obtained by orientation of polyvinyl alcohol dyed with iodine may be, for example, a polarizing plate disclosed in Japanese Patent No. 3708062 or Japanese Patent No. 4432487, or the like.

The long polarizing plate including a film obtained by polymerization of a composition containing a dye and a polymerizable liquid crystal compound (B) may be, for example, a polarizing plate disclosed in JP-A-2012-33249 or the like.

The polymerizable liquid crystal compound (B) is preferably a polymerizable liquid crystal compound having a smectic liquid crystallinity.

The thickness of the long polarizing plate is preferably small from the viewpoint of having a weight of a degree such that practical handling can be made. However, when the thickness is too small, the strength decreases, thereby having a tendency of being inferior in processability. The thickness of the long polarizing plate is typically 5 to 300 μm, preferably 20 to 200 μm.

The length of the long polarizing plate in the length direction is typically 10 to 3000 m, preferably 100 to 2000 m. The length of the long polarizing plate in the lateral direction is typically 0.1 to 5 m, preferably 0.2 to 2 m.

<Optical Alignment Membrane Forming Composition>

The optical alignment membrane forming composition contains a polymer or a monomer having a photoreactive group and a solvent.

The photoreactive group refers to a group that generates a liquid crystal alignment function by radiation of light. Specifically, a photoreaction giving an origin of the liquid crystal alignment function is generated, such as alignment induction of molecules or isomerization reaction, dimerization reaction, photocrosslinking reaction, or photodecomposition reaction, that is generated by radiation of light. Among the photoreactive groups, those generating a dimerization reaction or a photocrosslinking reaction are preferable because of being excellent in alignment property. The photoreactive group generating a reaction such as described above is preferably one having an unsaturated bond, particularly a double bond, and a group having at least one selected from the group consisting of carbon-carbon double bond (C=C bond), carbon-nitrogen double bond (C=N bond), nitrogen-nitrogen double bond (N=N bond), and carbon-oxygen double bond (C=O bond) is particularly preferable.

Examples of the photo reactive group having a C=C bond include vinyl group, polyene group, stilbene group, stilbazol group, stilbazolium group, chalcone group, and cinnamoyl group. Examples of the photoreactive group having a C=N bond include groups having a structure such as an aromatic Schiff base and an aromatic hydrazone. Examples of the photoreactive group having an N=N bond include azobenzene group, azonaphthalene group, aromatic heterocyclic azo group, bisazo group, formazan group, and those having azoxybenzene as a basic structure. Examples of the photoreactive group having a C=O bond include benzophenone group, coumalin group, anthraquinonegroup, and maleimide group. These groups may have a substituent such as an alkyl group, alkoxy group, aryl group, allyloxy group, cyano group, alkoxycarbonyl group, hydroxyl group, sulfonic acid group, or halogenated alkyl group.

Among these, a photoreactive group involved in photodimerization reaction is preferable, and a cinnamoyl group and a chalcone group are preferable because the amount of polarized light radiation needed for optical alignment is comparatively small, and an optical alignment membrane being excellent in stability with heat and stability with lapse of time is easily obtained. As the polymer having a photoreactive group, those having a cinnamoyl group in which the terminal end part of the polymer side chain thereof forms a cinnamic acid structure are particularly preferable.

As the solvent for the optical alignment membrane forming composition, those that dissolve polymers and monomers having a photo reactive group are preferable. Examples of the solvents include water; alcohols such as methanol, ethanol, ethylene glycol, isopropyl alcohol, propylene glycol, methyl cellosolve, butyl cellosolve, and propylene glycol monomethyl ether; ester-based solvents such as ethyl acetate, butyl acetate, ethylene glycol methyl ether acetate, gamma-butyrolactone, propylene glycol methyl ether acetate, and ethyl lactate; ketone-based solvents such as acetone, methyl ethyl ketone, cyclopentanone, cyclohexanone, methyl amyl ketone, and methyl isobutyl ketone; non-chlorine-based aliphatic hydrocarbon solvents such as pentane, hexane, and heptane; non-chlorine-based aromatic hydrocarbon solvents such as toluene and xylene; nitrile-based solvents such as acetonitrile; ether-based solvents such as tetrahydrofuran and dimethoxyethane; and chlorine-based solvents such as chloroform and chlorobenzene. These solvents may be used either singly or in combination.

The content of the polymer or monomer having a photoreactive group relative to the optical alignment membrane forming composition can be suitably adjusted in accordance with the kind of the polymer or monomer having a photoreactive group and the thickness of the optical alignment membrane that is to be produced; however, the content is preferably at least 0.2 mass % or more, and a range of 0.3 to 10 mass % is particularly preferable. Also, polymer materials such as polyvinyl alcohol or polyimide, or a photosensitizer may be contained within a range that does not considerably deteriorate the characteristics of the optical alignment membrane.

<First Application Membrane>

A first application membrane is formed by applying the aforesaid optical alignment membrane forming composition onto the long polarizing plate.

The method for continuously applying the optical alignment membrane forming composition onto the long polarizing plate may be, for example, the gravure coating method, the die coating method, the applicator method, the flexo method, or the like. Among these, the gravure coating method, the die coating method, and the flexo method are preferable.

<First Dried Coating Membrane>

A first dried coating membrane is formed by drying the first application membrane. In the description of the present application, those in which the content of the solvent contained in the first application membrane has decreased to be 50 mass % or less are referred to as the first dried coating membrane.

The method for drying the first application membrane may be, for example, the natural drying method, the air drying method, the heated drying method, the reduced-pressure drying method, or the like. A method obtained by combination of the air drying method and the heated drying method is preferably used. The drying temperature is typically lower than 120° C., preferably 30 to 110° C., more preferably 50 to 110° C., and still more preferably 70 to 100° C. The drying time is preferably 10 seconds to 60 minutes, more preferably 30 seconds to 30 minutes. When the drying temperature is 120° C. or higher, the polarization characteristics of the long polarizing plate are disadvantageously lowered. In particular, when the long polarizing plate including a film obtained by orientation of polyvinyl alcohol dyed with iodine is heated to 120° C. or higher, the contained iodine is sublimed, thereby lowering the polarization characteristics to a great extent.

By drying, the solvent contained in the first application membrane is removed.

The content of the solvent in the first dried coating membrane is preferably 30 mass % or less, more preferably 10 mass % or less, still more preferably 5 mass % or less, and most preferably 1 mass % or less.

<Long Optical Alignment Membrane>

A long optical alignment membrane in which the direction of an alignment restricting force is oblique relative to the length direction of the long polarizing plate is obtained by radiating a polarized light which is polarized in an oblique direction relative to the length direction of the long polarizing plate, onto the first dried coating membrane.

It is preferable that the polarized light is radiated directly onto the first dried coating membrane.

It is preferable that the polarized light is radiated in a direction perpendicular to the length direction and the lateral direction of the first dried coating membrane.

The wavelength of the polarized light is preferably within a wavelength range such that the photoreactive group in the polymer or monomer having a photoreactive group can absorb light energy. Specifically, ultraviolet ray having a wavelength within a range of from 250 to 400 nm is preferable.

A light source for the polarized light may be, for example, a xenon lamp, a high-pressure mercury lamp, an ultrahigh-pressure mercury lamp, a metal halide lamp, an ultraviolet ray laser such as KrF or ArF, or the like. Among these, a high-pressure mercury lamp, an ultrahigh-pressure mercury lamp, and a metal halide lamp are preferable. These lamps are preferable because the intensity of light emission of the ultraviolet ray having a wavelength of 313 nm is large.

The polarized light can be obtained, for example, by allowing the light from the light source to pass through a polarizer. By adjusting the polarization angle of the polarizer, the direction of the axis of the polarized light can be adjusted in an arbitrary manner. Examples of the polarizers include a polarizing filter, a polarizing prism such as a Glan-Thompson prism or a Glan-Taylor prism, and a polarizer of wire grid type. It is preferable that the polarized light is substantially a parallel light.

The alignment restricting force acts in a perpendicular direction or in a parallel direction relative to the direction of the polarization axis of polarized light. Therefore, by adjusting the polarization angle, the direction of the alignment restricting force can be adjusted in an arbitrary manner. The angle formed by the direction of the polarization axis of the polarized light and the length direction of the long polarizing plate is preferably 5° to 85°, more preferably 20° to 70°, still more preferably 30° to 60°, and most preferably 45°. Preferably, the direction of the polarization axis of polarized light and the thickness direction of the long polarizing plate are perpendicular to each other. Also, when masking is carried out at the time of radiating the polarized light, a plurality of different regions (patterns) can be formed in the obtained direction of the alignment restricting force. Preferably, the long optical alignment membrane has a uniform alignment pattern.

Thus, a long alignment film is obtained in which the long polarizing plate and the long optical alignment membrane are stacked, where the direction of the alignment restricting force of the long optical alignment membrane is oblique relative to the length direction of the long polarizing plate. Preferably, the direction of the alignment restricting force of the long optical alignment membrane and the thickness direction of the long polarizing plate are perpendicular to each other.

The angle formed by the direction of the alignment restricting force and the length direction of the long polarizing plate is preferably 5° to 85°, more preferably 20° to 70°, still more preferably 30° to 60°, and most preferably 45°.

The long optical alignment membrane preferably has a solvent resistance of not being dissolved into a liquid crystal cured membrane forming composition at the time of applying the liquid crystal cured membrane forming composition. Also, the long optical alignment membrane preferably has a heat resistance in a heating process for drying or aligning a polymerizable liquid crystal compound (A). Further, it is preferable that exfoliation or the like is not generated by friction or the like at the time of transporting the long alignment film.

The membrane thickness of the long optical alignment membrane is typically 10 nm to 10000 nm, preferably 10 nm to 1000 nm, more preferably 500 nm or less, and also more preferably 10 nm or more. By setting the membrane thickness to be within the above range, the alignment restricting force is sufficiently exhibited.

The long alignment film in which the long optical alignment membrane having an alignment restricting force is formed on the long polarizing plate can be used as an alignment film that induces alignment of a liquid crystal material. Therefore, the long alignment film in which the long polarizing plate and the long optical alignment membrane are stacked, where the direction of the alignment restricting force of the optical alignment membrane is oblique relative to the length direction of the long polarizing plate, is useful for production of a long circularly polarizing plate in which the direction of the optical axis is oblique relative to the length direction of the polarizing plate, so that the long alignment film can be used for continuously producing a long circularly polarizing plate.

<Liquid Crystal Cured Membrane Forming Composition>

The liquid crystal cured membrane forming composition in the present invention contains a polymerizable liquid crystal compound (A) and a solvent.

The polymerizable liquid crystal compound (A) is a compound having a polymerizable group and having a liquid crystal property. The polymerizable group refers to a group involved in polymerization reaction, and is preferably a photopolymerizable group. Here, the photopolymerizable group refers to a group capable of being involved in polymerization reaction by an activated radical or acid generated from a photopolymerization initiator described later. Examples of the polymerizable groups include vinyl group, vinyloxy group, 1-chlorovinyl group, isopropenyl group, 4-vinylphenyl group, acryloyloxy group, methacryloyloxy group, oxiranyl group, and oxetanyl group. Among these, acryloyloxy group, methacryloyloxy group, vinyloxy group, oxiranyl group, and oxetanyl group are preferable, and acryloyloxy group is more preferable. With regard to the liquid crystal property, the liquid crystal may be either a thermotropic liquid crystal or a lyotropic liquid crystal, and also the thermotropic liquid crystal may be either a nematic liquid crystal or a smectic liquid crystal.

As the polymerizable liquid crystal compound (A), a thermotropic nematic liquid crystal is preferable from the viewpoint of facility in production.

A preferable polymerizable liquid crystal compound (A) contained in the liquid crystal cured membrane forming composition may be, for example, a compound (which may hereafter be referred to as compound (A)) represented by the following formula (A).

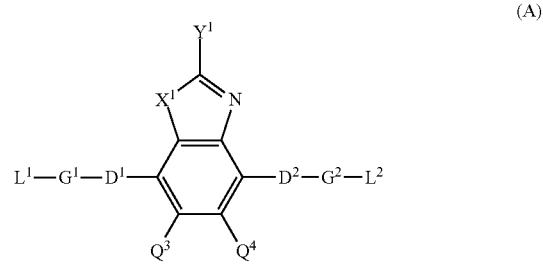

(A)

[In the formula (A), $X^1$ represents an oxygen atom, a sulfur atom, or $NR^1$—; $R^1$ represents a hydrogen atom or an alkyl group having a carbon number of 1 to 4;

$Y^1$ represents a monovalent aromatic hydrocarbon group having a carbon number of 6 to 12 and optionally having a substituent or a monovalent aromatic heterocyclic group having a carbon number of 3 to 12 and optionally having a substituent;

$Q^3$ and $Q^4$ each independently represent a hydrogen atom, a monovalent aliphatic hydrocarbon group having a carbon number of 1 to 20 and optionally having a substituent, a monovalent alicyclic hydrocarbon group having a carbon number of 3 to 20, a monovalent aromatic hydrocarbon group having a carbon number of 6 to 20 and optionally having a substituent, a halogen atom, a cyano group, a nitro group, $—NR^2R^3$, or $—SR^2$, or $Q^3$ and $Q^4$ are bonded with each other to form an aromatic ring or an aromatic heterocyclic ring together with carbon atoms to which these are bonded; $R^2$ and $R^3$ each independently represent a hydrogen atom or an alkyl group having a carbon number of 1 to 6;

$D^1$ and $D^2$ each independently represent a single bond, —C(=O)—O—, —C(=S)—O—, —CR⁴R⁵—, —CR⁴R⁵—CR⁶R⁷—, —O—CR⁴R⁵—, —CR⁴R⁵—O—CR⁶R⁷—, —CO—O—CR⁴R⁵—, —O—CO—CR⁴R⁵—, —CR⁴R⁵—O—CO—CR⁶R⁷—, —CR⁴R⁵—CO—O—CR⁶R⁷—, NR⁴—CR⁵R⁶—, or CO—NR⁴—;

$R^4$, $R^5$, $R^6$, and $R^7$ each independently represent a hydrogen atom, a fluorine atom, or an alkyl group having a carbon number of 1 to 4;

$G^1$ and $G^2$ each independently represent a divalent alicyclic hydrocarbon group having a carbon number of 5 to 8, where a methylene group constituting the alicyclic hydrocarbon group may be substituted with an oxygen atom, a sulfur atom, or NH—, and a methine group constituting the alicyclic hydrocarbon group may be substituted with a tertiary nitrogen atom; and $L^1$ and $L^2$ each independently represent a monovalent organic group, where at least one of $L^1$ and $L^2$ has a polymerizable group.]

$L^1$ in the compound (A) is preferably a group represented by the formula (A1), and $L^2$ is preferably a group represented by the formula (A2).

P¹—F¹—(B¹-A¹)ₖ-E¹-    (A1)

P²—F²—(B²-A²)ₗ-E²-    (A2)

[In the formulas (A1) and (A2), $B^1$, $B^2$, $E^1$, and $E^2$ each independently represent —CR⁴R⁵—, —CH₂—CH₂—, —O—, —S—, —CO—O—, —O—CO—O—, —CS—O—, —O—CS—O—, —CO—NR¹—, —O—CH₂—, —S—CH₂—, or a single bond;

$A^1$ and $A^2$ each independently represent a divalent alicyclic hydrocarbon group having a carbon number of 5 to 8 or a divalent aromatic hydrocarbon group having a carbon number of 6 to 18, where a methylene group constituting the alicyclic hydrocarbon group may be substituted with an oxygen atom, a sulfur atom, or NH—, and a methine group constituting the alicyclic hydrocarbon group may be substituted with a tertiary nitrogen atom;

k and l each independently represent an integer of 0 to 3;

$F^1$ and $F^2$ represent a divalent aliphatic hydrocarbon group having a carbon number of 1 to 12;

$P^1$ represents a polymerizable group;

$P^2$ represents a hydrogen atom or a polymerizable group; and $R^4$ and $R^5$ each independently represent a hydrogen atom, a fluorine atom, or an alkyl group having a carbon number of 1 to 4.]

A preferable compound (A) is a polymerizable liquid crystal compound (A) disclosed in JP-A-2011-207765.

Specific examples of the polymerizable liquid crystal compounds (A) include compounds having a polymerizable group among the compounds disclosed in "3.8.6 Nettowaku (Network) (Kanzen Kakyo-gata (complete crosslinking type))", "6.5.1 Ekisho Zairyo (Liquid Crystal Materials) b. Jyugosei Nemachikku Ekisho Zairyo (Polymerizable Nematic Liquid Crystal Materials)" of Ekisho Binran (Liquid Crystal Handbook) (edited by Ekisho Binran Henshu Iinkai (Liquid Crystal Handbook Editorial Committee), issued by Maruzen Co., Ltd. on Oct. 30, 2000).

When the liquid crystal cured membrane forming composition contains the above compound (A), the liquid crystal cured membrane forming composition may further contain a polymerizable liquid crystal compound (A) that is different from the compound (A).

Examples of the polymerizable liquid crystal compounds (A) different from the compound (A) include a compound (which may hereafter referred to as "compound (6)") having a group represented by the formula (6).

P¹¹—B¹¹-E¹¹-B¹²-A¹¹-B¹³—    (6)

(in the formula (6), $P^{11}$ represents a polymerizable group;

$A^{11}$ represents a divalent alicyclic hydrocarbon group or a divalent aromatic hydrocarbon group; a hydrogen atom contained in the divalent alicyclic hydrocarbon group and the divalent aromatic hydrocarbon group may be substituted with a halogen atom, an alkyl group having a carbon number of 1 to 6, an alkoxy group having a carbon number of 1 to 6, a cyano group, or a nitro group; a hydrogen atom contained in the alkyl group having a carbon number of 1 to 6 and the alkoxy group having a carbon number of 1 to 6 may be substituted with a fluorine atom;

$B^{11}$ represents —O—, —S—, —CO—O—, —O—CO—, —O—CO—O—, —CO—NR¹⁶—, —NR¹⁶—CO—, —CO—, —CS—, or a single bond; $R^{16}$ represents a hydrogen atom or an alkyl group having a carbon number of 1 to 6;

$B^{12}$ and $B^{13}$ each independently represent —C≡C—, —CH=CH—, —CH₂—CH₂—, —O—, —S—, —C(=C)—, —C(=O)—O—, —O—C(=O)—, —O—C(=O)—O—, —CH=N—, —N=CH—, —N=N—, —C(=O)—NR¹⁶—, —NR¹⁶—C(=O)—, —OCH₂—, —OCF₂—, —CH₂O—, —CF₂O—, —CH=CH—C(=O)—O—, —O—C(=O)—CH=CH—, or a single bond;

$E^{11}$ represents an alkylene group having a carbon number of 1 to 12, and a hydrogen atom contained in the alkylene group may be substituted with an alkyl group having a carbon number of 1 to 5 or an alkoxy group having a carbon number of 1 to 5; a hydrogen atom contained in the alkyl group and the alkoxy group may be substituted with a halogen atom, and —CH₂— contained in the alkylene group may be substituted with —O— or —CO—.)

Because photopolymerization, for example, is used in order to cure the retardation plate, $P^{11}$ is preferably a radical-polymerizable group or a cationic-polymerizable group suitable for photopolymerization. In particular, $P^{11}$ is preferably a group represented by the following formulas (P-1) to (P-5) because of the facility in handling and facility in production.

(P-1)

(P-2)

(P-3)

(P-4)

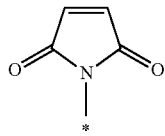
(P-5)

[In the formulas (P-1) to (P-5), $R^{17}$ to $R^{21}$ each independently represent an alkyl group having a carbon number of 1 to 6 or a hydrogen atom, and * represents a bonding hand with $B^{11}$.]

$P^{11}$ is preferably a group represented by the formulas (P-4) to (P-10), and examples thereof include vinyl group, p-(2-phenylethenyl)phenyl group, oxiranyl group, oxetanyl group, isocyanate group, and isothiocyanate group.

(P-6)

(P-7)

(P-8)

(P-9)

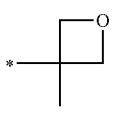
(P-10)

More preferably, $P^{11}$—$B^{11}$— is an acryloyloxy group or a methacryloyloxy group.

The carbon number of the aromatic hydrocarbon group and the alicyclic hydrocarbon group of $A^{11}$ may be, for example, 3 to 18, preferably 5 to 12, and more preferably 5 or 6. $A^{11}$ is preferably a 1,4-cyclohexylene group or a 1,4-phenylene group.

$E^{11}$ is preferably an alkylene group having a carbon number of 1 to 12 and not branched into two or more, and —CH$_2$— contained in the alkylene group may be substituted with —O—.

Specific examples thereof include methylene group, ethylene group, propylene group, butylene group, pentylene group, hexylene group, heptylene group, octylene group, nonylene group, decalene group, undecalene group, dodecylene group, —CH$_2$—CH$_2$—O—CH$_2$—CH$_2$—, —CH$_2$—CH$_2$—O—CH$_2$—CH$_2$—O—CH$_2$—CH$_2$—, and —CH$_2$—CH$_2$—O—CH$_2$—CH$_2$—O—CH$_2$—CH$_2$—O—CH$_2$—CH$_2$—.

The compound (6) may be, for example, a compound represented by the formula (I), (II), (III), (IV), (V), or (VI).

$$P^{11}-B^{11}-E^{11}-B^{12}-A^{11}-B^{13}-A^{12}-B^{14}-A^{13}-B^{15}-A^{14}-B^{16}-E^{12}-B^{17}-P^{12} \quad (I)$$

$$P^{11}-B^{11}-E^{11}-B^{12}-A^{11}-B^{13}-A^{12}-B^{14}-A^{13}-B^{15}-A^{14}-F^{11} \quad (II)$$

$$P^{11}-B^{11}-E^{11}-B^{12}-A^{11}-B^{13}-A^{12}-B^{14}-A^{13}-B^{15}-E^{12}-B^{17}-P^{12} \quad (III)$$

$$P^{11}-B^{11}-E^{11}-B^{12}-A^{11}-B^{13}-A^{12}-B^{14}-A^{13}-F^{11} \quad (IV)$$

$$P^{11}-B^{11}-E^{11}-B^{12}-A^{11}-B^{13}-A^{12}-B^{14}-E^{12}-B^{17}-P^{12} \quad (V)$$

$$P^{11}-B^{11}-E^{11}-B^{12}-A^{11}-B^{13}-A^{12}-F^{11} \quad (VI)$$

(In the formulas, $A^{12}$ to $A^{14}$ have the same meaning as $A^{11}$; $B^{14}$ to $B^{16}$ have the same meaning as $B^{12}$; $B^{17}$ has the same meaning as $B^{11}$; $E^{12}$ has the same meaning as $E^{11}$;

$F^{11}$ represents a hydrogen atom, an alkyl group having a carbon number of 1 to 13, an alkoxy group having a carbon number of 1 to 13, a nitrile group, a nitro group, a trifluoromethyl group, a dimethylamino group, a hydroxy group, a hydroxymethyl group, a formyl group, a sulfo group, a carboxy group, a carboxyl group esterified with an alcohol having a carbon number of 1 to 10, or a halogen atom; and —CH$_2$— contained in the alkyl group and the alkoxy group may be substituted with —O—.)

Specific examples of the compound (6) include the compounds represented by the following formulas. Here, in the formulas, k1 and k2 represent an integer of 2 to 12. These liquid crystal compounds are preferable because of being readily obtainable such as being easily synthesizable or being commercially available.

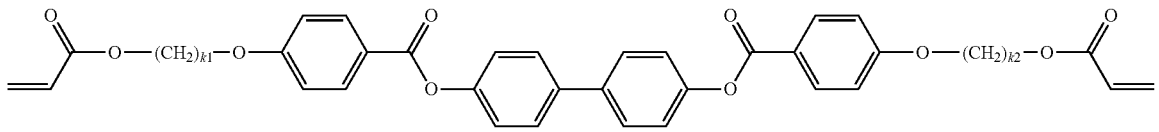
(I-1)

-continued
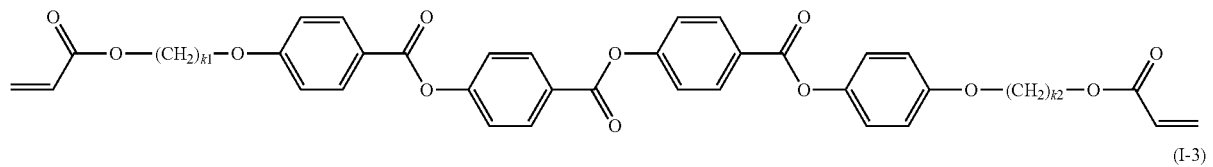
(I-2)
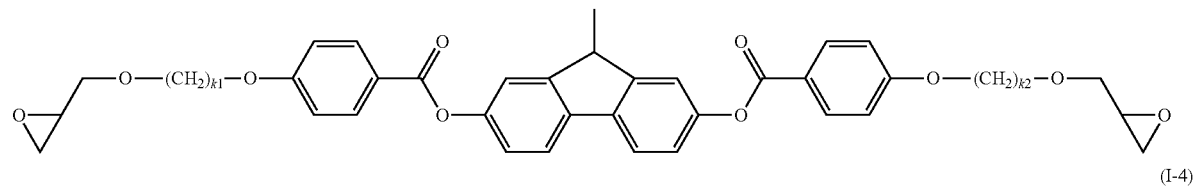
(I-3)
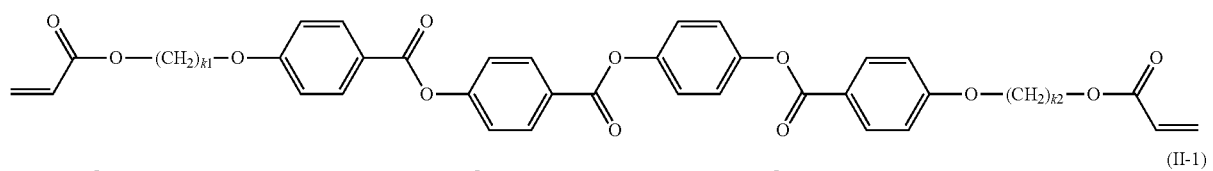
(I-4)
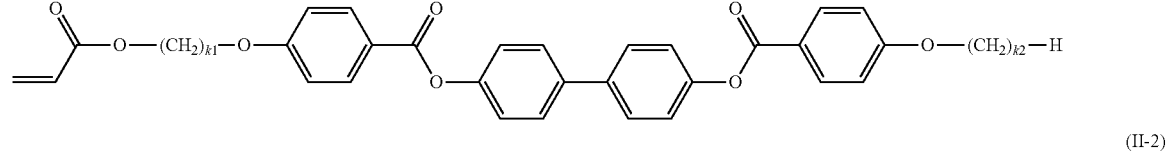
(II-1)
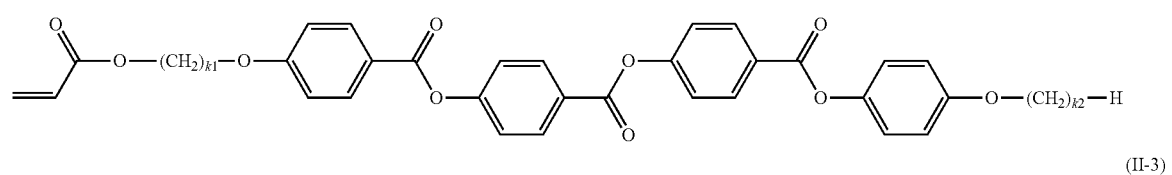
(II-2)
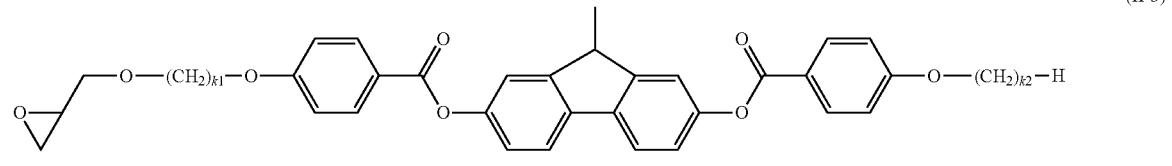
(II-3)
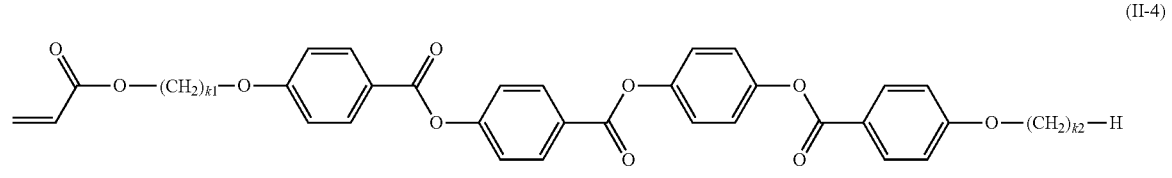
(II-4)
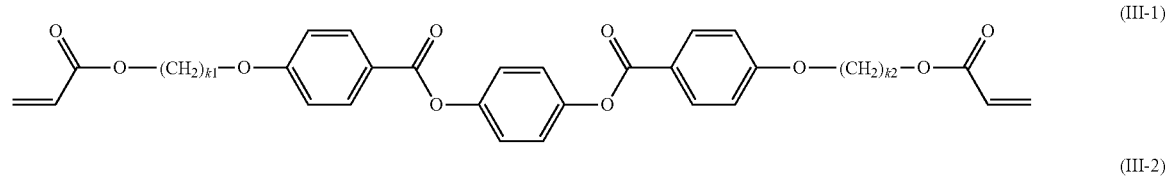
(III-1)
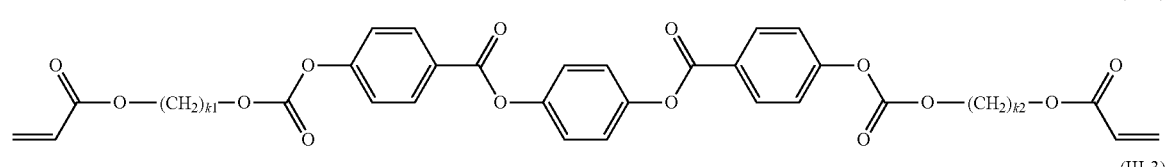
(III-2)
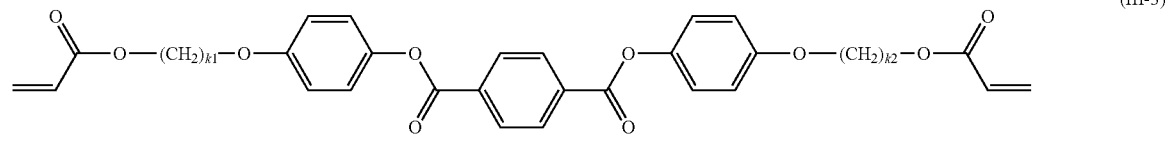
(III-3)

-continued
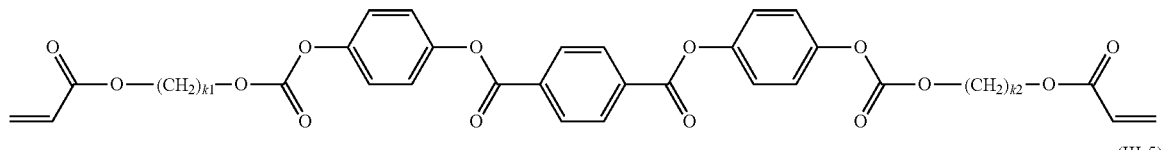
(III-4)
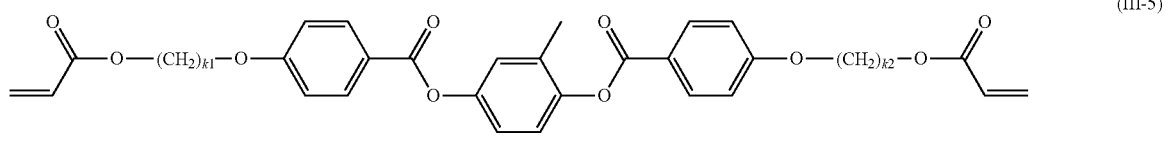
(III-5)
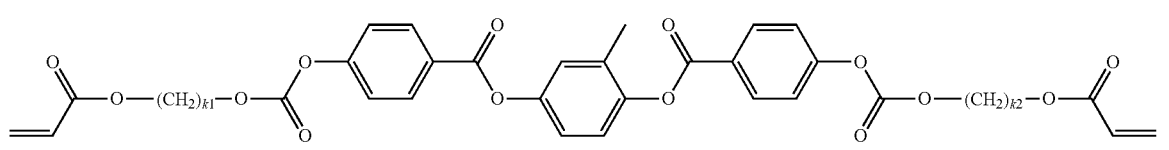
(III-6)
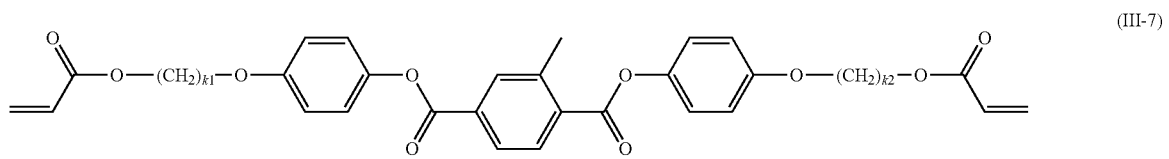
(III-7)
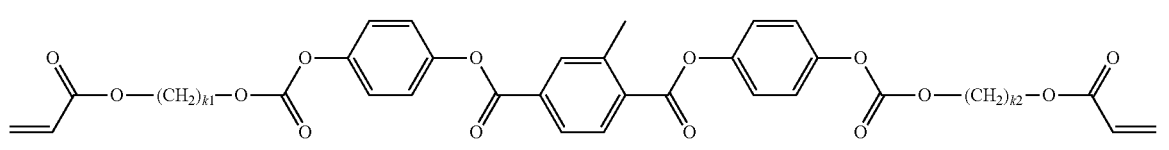
(III-8)
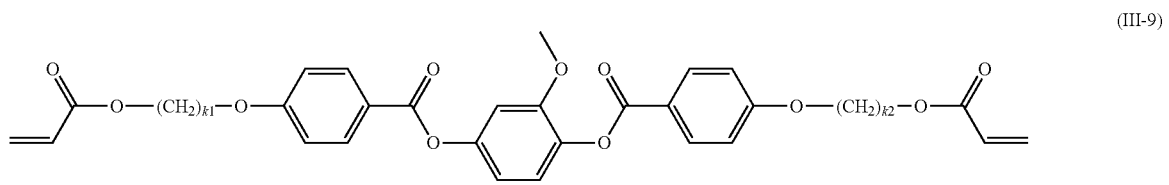
(III-9)
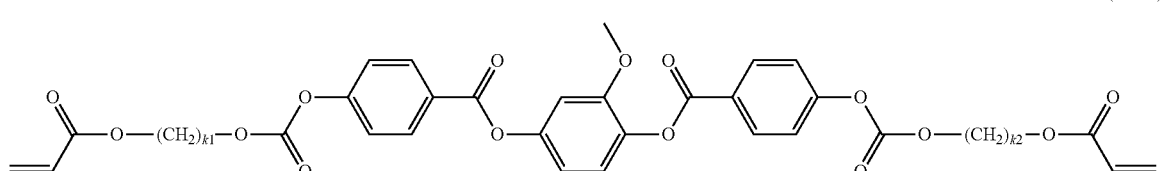
(III-10)
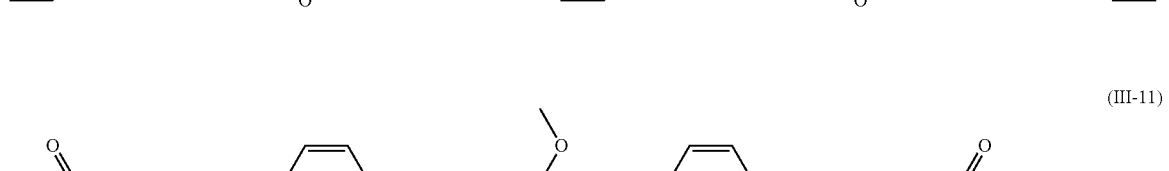
(III-11)
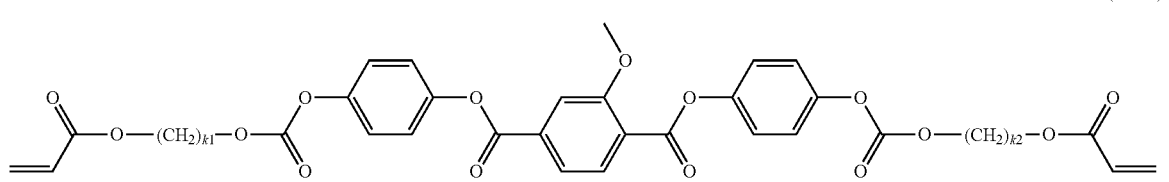
(III-12)

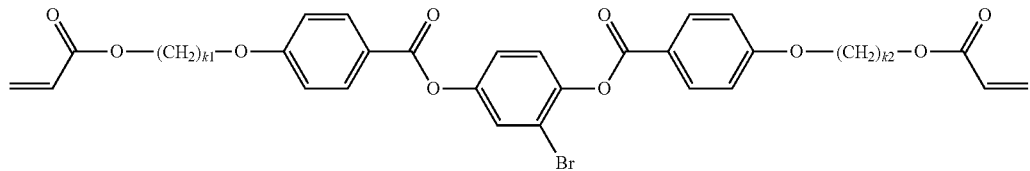
(III-13)
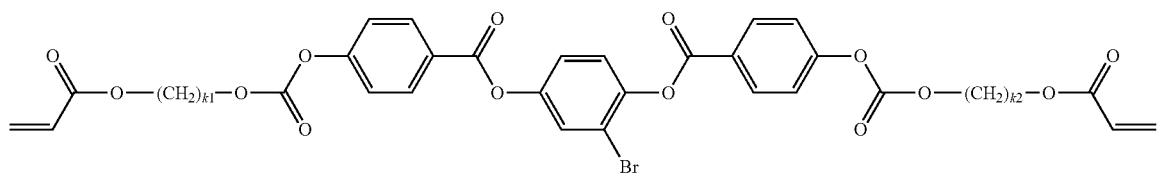
(III-14)
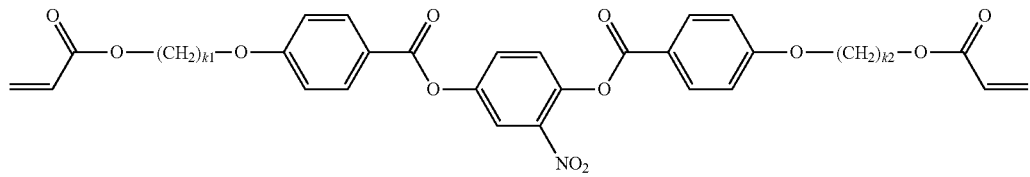
(III-15)
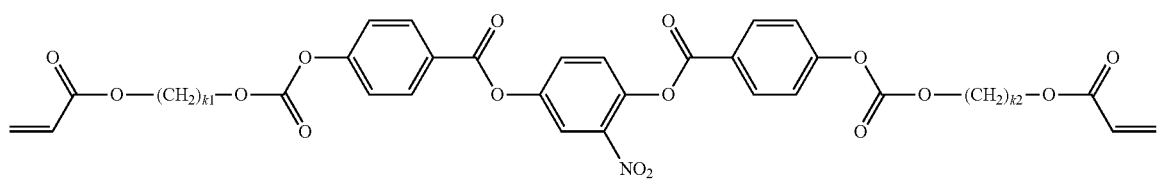
(III-16)
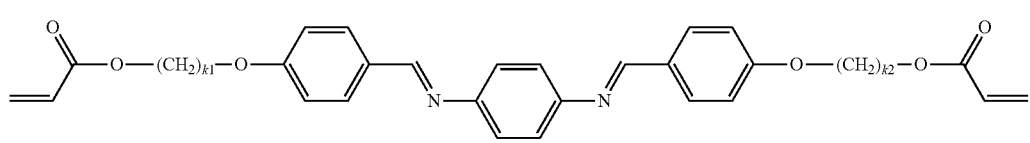
(III-17)
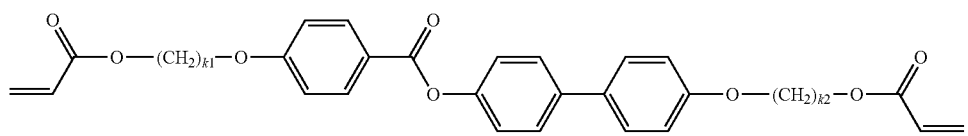
(III-18)
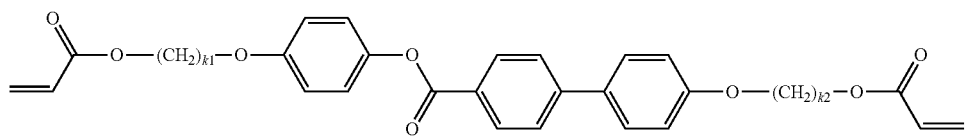
(III-19)
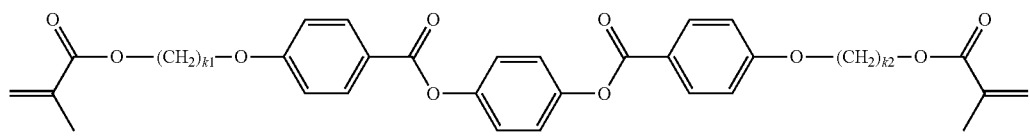
(III-20)
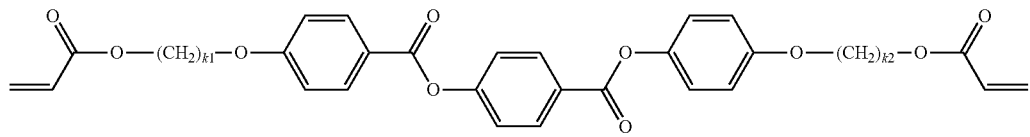
(III-21)

-continued
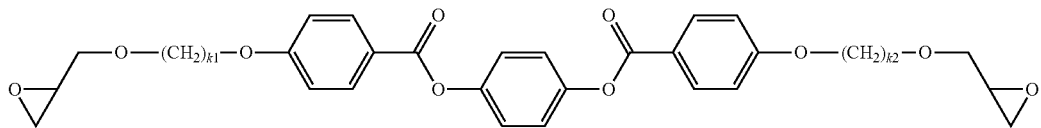
(III-22)
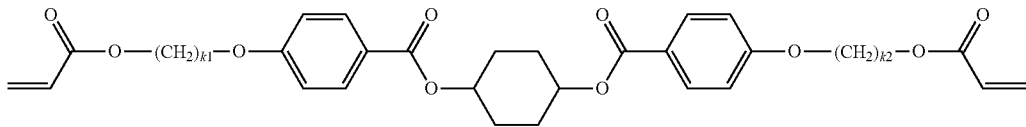
(III-23)
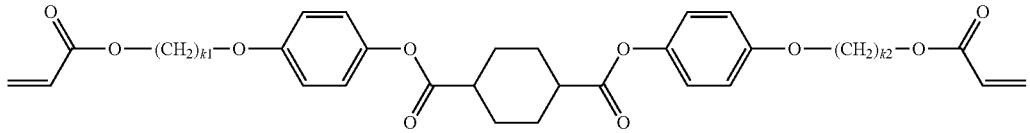
(III-24)
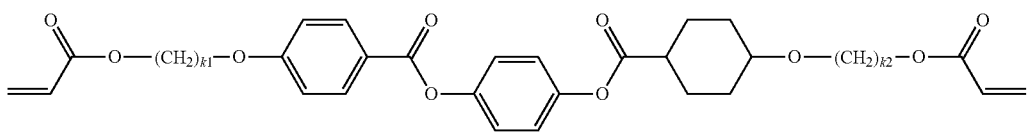
(III-25)
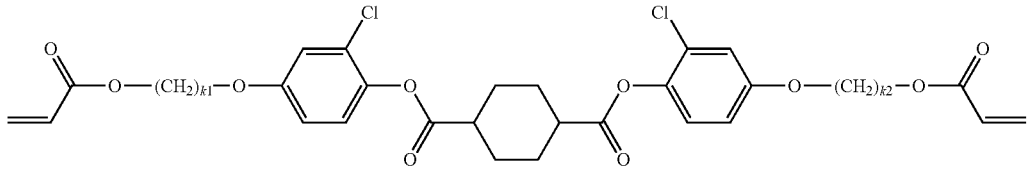
(III-26)
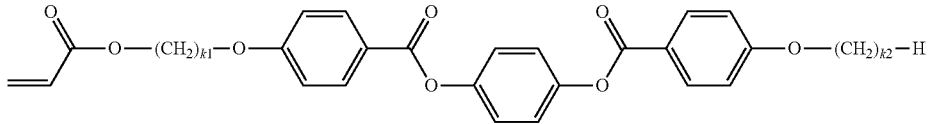
(IV-1)
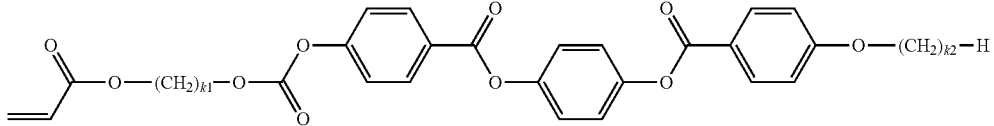
(IV-2)
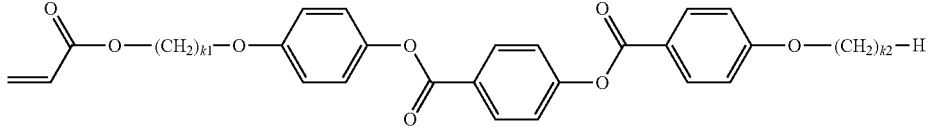
(IV-3)
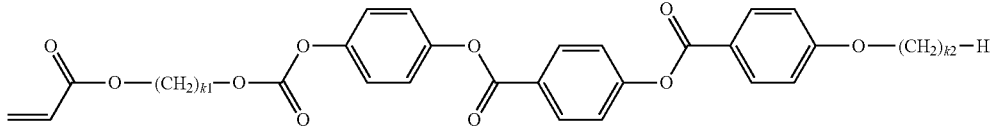
(IV-4)
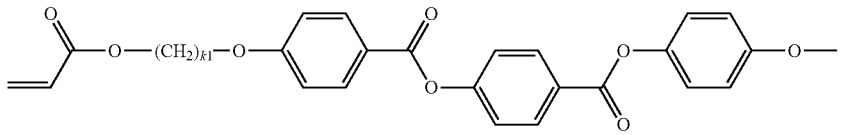
(IV-5)
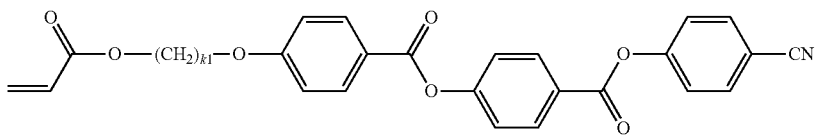
(IV-6)

-continued
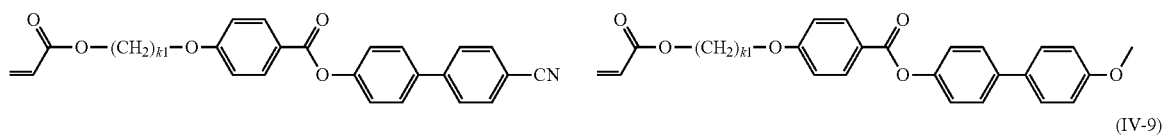
(IV-7)
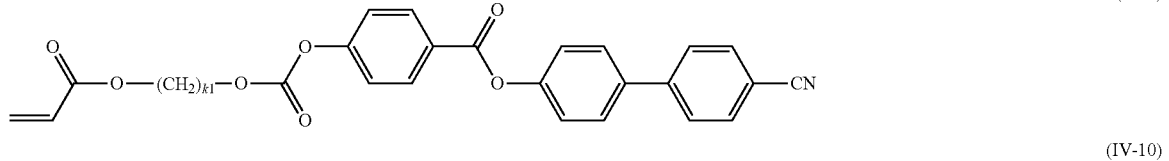
(IV-8)
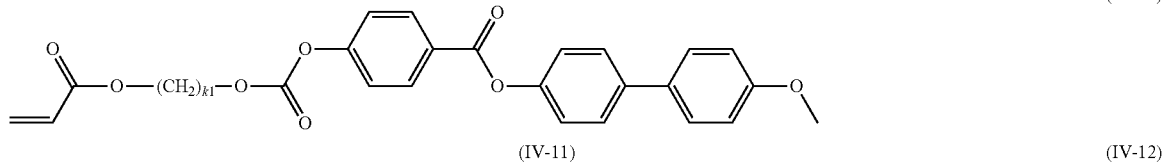
(IV-9)
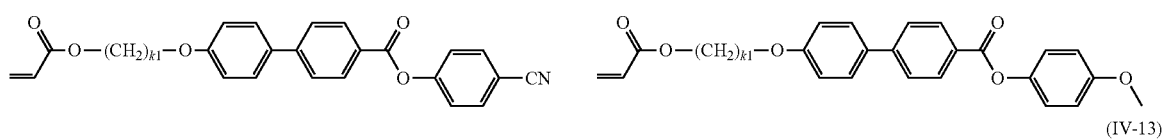
(IV-10)
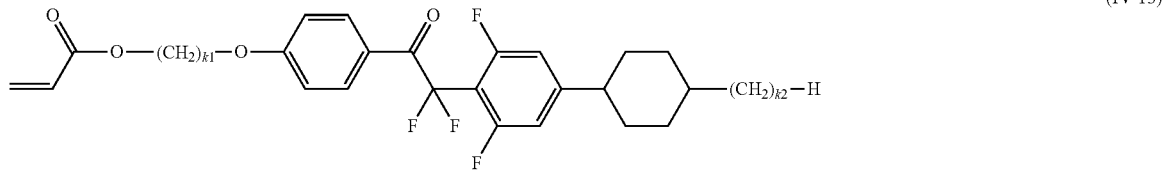
(IV-11)
(IV-12)
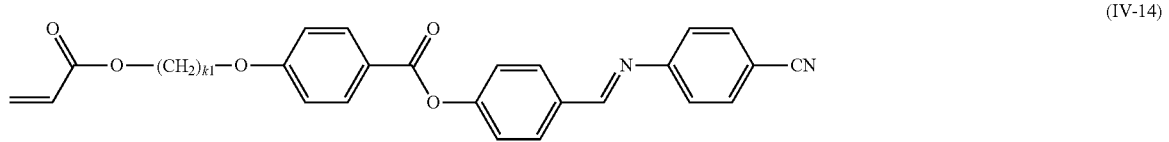
(IV-13)
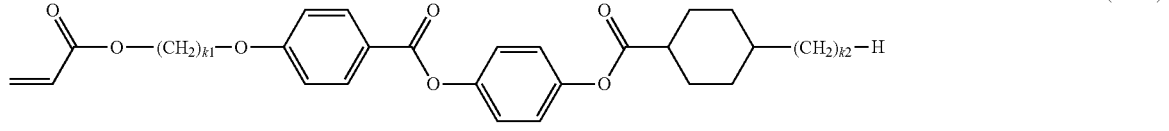
(IV-14)
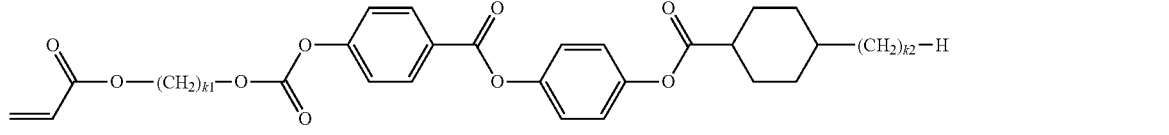
(IV-15)
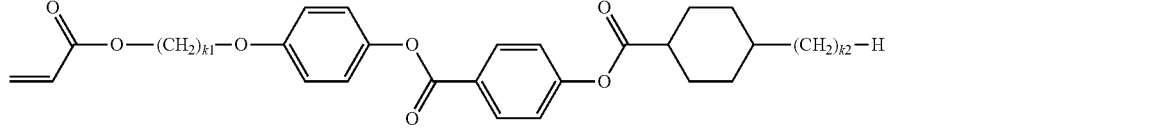
(IV-16)
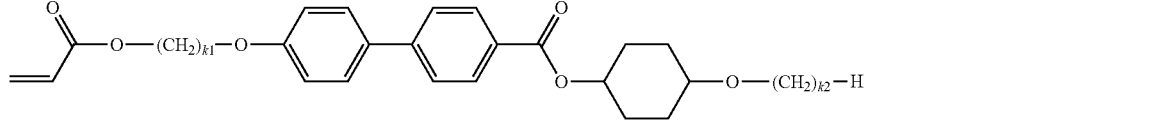
(IV-17)
(IV-18)
(IV-19)

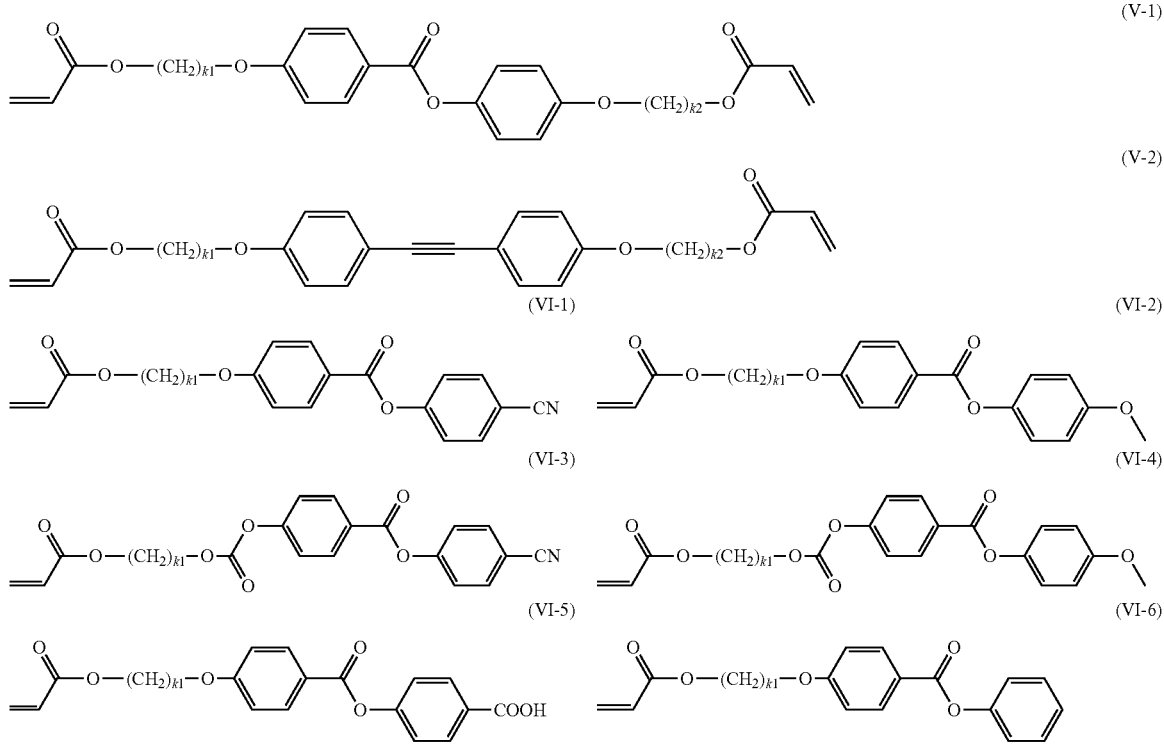

Specific examples of the polymerizable liquid crystal compounds (A) different from the compound (A) include compounds having a polymerizable group among the compounds disclosed in 3.2 Non Kiraru Bojyo Ekisho Bunshi (Non-chiral Rod-shaped Liquid Crystal Molecules) and 3.3 Kiraru Bojyo Ekisho Bunshi (Chiral Rod-shaped Liquid Crystal Molecules) of Chapter 3 Bunshikozo To Ekishosei (Molecular Structure And Liquid Crystallinity of Ekisho Binran (Liquid Crystal Handbook) (edited by Ekisho Binran Henshu Tinkai (Liquid Crystal Handbook Editorial Committee), issued by Maruzen Co., Ltd. on Oct. 30, 2000).

When the liquid crystal cured membrane forming composition contains the compound (A) and polymerizable liquid crystal compounds (A) different from the compound (A) as the polymerizable liquid crystal compound (A), the content of the polymerizable liquid crystal compounds (A) different from the compound (A) is preferably 90 parts by mass or less relative to 100 parts by mass of the polymerizable liquid crystal compound (A).

The content of the polymerizable liquid crystal compound (A) in the liquid crystal cured membrane forming composition is typically 70 to 99.5 parts by mass, preferably 80 to 99 parts by mass, more preferably 80 to 94 parts by mass, and still more preferably 80 to 90 parts by mass, relative to 100 parts by mass of the solid component of the liquid crystal cured membrane forming composition. When the content of the polymerizable liquid crystal compound (A) is within the above range, the alignment property tends to be enhanced. Here, the solid component refers to a sum amount of the components of the liquid crystal cured membrane forming composition excluding the solvent.

The solvent is preferably one that can completely dissolve the polymerizable liquid crystal compound (A), and is preferably a solvent that is inactive to the polymerization reaction of the polymerizable liquid crystal compound (A).

Examples of the solvent include alcohol solvents such as methanol, ethanol, ethylene glycol, isopropyl alcohol, propylene glycol, ethylene glycol methyl ether, ethylene glycol butyl ether, and propylene glycol monomethyl ether; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, 2-heptanone, and methyl isobutyl ketone; aliphatic hydrocarbon solvents such as pentane, hexane, and heptane; aromatic hydrocarbon solvents such as toluene and xylene; nitrile solvents such as acetonitrile; ether solvents such as tetrahydrofuran and dimethoxyethane; chlorine-containing solvents such as chloroform and chlorobenzene; and lactam-based solvents such as N-methyl-2-pyrrolidone. These solvents may be used either singly or in combination.

The content of the solvent is preferably 50 to 98 mass % relative to the total amount of the liquid crystal cured membrane forming composition. In other words, the content of the solid component in the liquid crystal cured membrane forming composition is preferably 2 to 50 mass %. When the content of the solid component is 50 mass % or less, the viscosity of the liquid crystal cured membrane forming composition becomes low, so that the thickness of the liquid crystal cured membrane becomes approximately uniform, thereby giving a tendency such that unevenness is less likely to be generated in the liquid crystal cured membrane. Also, the content of the solid component such as this can be determined in consideration of the thickness of the liquid crystal cured membrane that is to be produced.

The liquid crystal cured membrane forming composition may contain a polymerization initiator, a sensitizer, a polymerization inhibitor, a levelling agent, and a polymerizable non-liquid-crystal compound as components other than the polymerizable liquid crystal compound (A) and the solvent.

(Polymerization initiator)

The liquid crystal cured membrane forming composition typically contains a polymerization initiator. The polymerization initiator is a compound that can start the polymerization reaction of the polymerizable liquid crystal compound (A) or the like. The polymerization initiator is preferably a photopolymerization initiator that generates active radicals by action of light.

Examples of the polymerization initiator include a benzoin compound, a benzophenone compound, an alkylphenone compound, an acylphosphine oxide compound, a triazine compound, an iodonium salt, and a sulfonium salt.

Examples of the benzoin compound include benzoin, benzoin methyl ether, benzoin ethyl ether, benzoin isopropyl ether, and benzoin isobutyl ether.

Examples of the benzophenone compound include benzophenone, methyl o-benzoylbenzoate, 4-phenylbenzophenone, 4-benzoyl-4'-methyldiphenyl sulfide, 3,3',4,4'-tetra (tert-butylperoxycarbonyl)benzophenone, and 2,4,6-trimethylbenzophenone.

Examples of the alkylphenone compound include oligomers of diethoxyacetophenone, 2-methyl-2-morpholino-1-(4-methylthiophenyl)propane-1-one, 2-benzyl-2-dimethylamino-1-(4-morpholinophenyl)butane-1-one, 2-hydroxy-2-methyl-1-phenylpropane-1-one, 1,2-diphenyl-2,2-dimethoxyethane-1-one, 2-hydroxy-2-methyl-1-[4-(2-hydroxyethoxy)phenyl]propane-1-one, 1-hydroxycyclohexyl phenyl ketone, and 2-hydroxy-2-methyl-1-[4-(1-methylvinyl)phenyl]propane-1-one Examples of the acylphosphine oxide compound include 2,4,6-trimethylbenzoyldiphenylphosphine oxide and bis(2, 4,6-trimethylbenzoyl)phenylphosphine oxide.

Examples of the triazine compound include 2,4-bis (trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl) ethenyl]-1,3,5-triazine, 2,4-bis(trichloromethyl)-6-[2-(4-diethylamino-2-methylphenyl)ethenyl]-1,3,5-triazine, and 2,4-bis(trichloromethyl)-6-[2-(3,4-dimethoxyphenyl)ethenyl]-1,3,5-triazine.

As the polymerization initiator, a commercially available one can be used. Examples of the commercially available polymerization initiators include "Irgacure (registered trademark) 907", "Irgacure (registered trademark) 184", "Irgacure (registered trademark) 651", "Irgacure (registered trademark) 819", "Irgacure (registered trademark) 250", and "Irgacure (registered trademark) 369" manufactured by Chiba Japan Co., Ltd.; "SEIKUOL (registered trademark) BZ", "SEIKUOL (registered trademark) Z", and "SEIKUOL (registered trademark) BEE" manufactured by Seiko Chemical Co., Ltd.; "kayacure (registered trademark ) BP100" manufactured by Nippon Kayaku Co., Ltd.; "kayacure (registered trademark) UVI-6992" manufactured by Dow Chemical Company; "Adekaoptomer SP-152" and "Adekaoptomer SP-170" manufactured by ADEKA CORPORATION; "TAZ-A" and "TAZ-PP" manufactured by Nihon SiberHegner K. K.; and "TAZ-104" manufactured by SANWA Chemical Co., Ltd.

The content of the polymerization initiator in the liquid crystal cured membrane forming composition can be suitably adjusted in accordance with the kind of the polymerizable liquid crystal compound (A) and the amount thereof; however, the content is typically 0.1 to 30 parts by mass, preferably 0.5 to 10 parts by mass, more preferably 0.5 to 8 parts by mass, relative to 100 parts by mass of the content of the polymerizable liquid crystal compound (A). When the content of the polymerization initiator is within this range, the alignment of the polymerizable liquid crystal compound (A) is not disturbed, so that it is preferable.

(Sensitizer)

The liquid crystal cured membrane forming composition may further contain a sensitizer. The sensitizer is preferably a photosensitizer. Examples of the sensitizer include xanthone compounds such as xanthone and thioxantnone (for example, 2,4-diethylthioxanthone, 2-isopropylthioxanthone, and the like); anthracene compounds such as anthracene and alkoxy-containing anthracene (for example, dibutoxyanthracene and the like); phenothiazine; and rubrene.

When the liquid crystal cured membrane forming composition contains a sensitizer, the polymerization reaction of the polymerizable liquid crystal compound (A) contained in the liquid crystal cured membrane forming composition can be further promoted. The amount of use of such a sensitizer is preferably 0.1 to 30 parts by mass, more preferably 0.5 to 10 parts by mass, and still more preferably 0.5 to 8 parts by mass, relative to 100 parts by mass of the content of the polymerizable liquid crystal compound (A).

(Polymerization inhibitor)

The liquid crystal cured membrane forming composition may further contain a polymerization inhibitor. When a polymerization inhibitor is contained, the degree of progression of the polymerization reaction of the polymerizable liquid crystal compound (A) can be controlled, and the polymerization reaction can be allowed to proceed in a stable manner.

Examples of the polymerization inhibitor include radical scavengers such as hydroquinone, alkoxy-containing hydroquinone, alkoxy-containing catechol (for example, butylcatechol or the like), pyrogallol, and 2,2,6,6-tetramethyl-1-piperidinyloxy radical; thiophenols; β-naphthylamines; and β-naphthols.

When a polymerization inhibitor is contained in the liquid crystal cured membrane forming composition, the content thereof is preferably 0.1 to 30 parts by mass, more preferably 0.5 to 10 parts by mass, and still more preferably 0.5 to 8 parts by mass, relative to 100 parts by mass of the content of the polymerizable liquid crystal compound (A). When the content of the polymerization inhibitor is within this range, the polymerization can be allowed to proceed without disturbing the alignment of the polymerizable liquid crystal compound (A), so that it is preferable.

(Levelling agent)

A levelling agent may be contained in the liquid crystal cured membrane forming composition. A levelling agent has a function of adjusting the fluidity of the liquid crystal cured membrane forming composition and making the membrane obtained by applying the liquid crystal cured membrane forming composition be more smooth and flat, and may be, for example, a surfactant. Preferable examples of the levelling agent include levelling agents containing a polyacrylate compound as a major component and levelling agents containing a fluorine-atom-containing compound as a major component.

Examples of the levelling agents containing a polyacrylate compound as a major component include "BYK-350", "BYK-352", "BYK-353", "BYK-354", "BYK-355", "BYK-358N", "BYK-361N", "BYK-380", "BYK-381", and "BYK-392" manufactured by BYK-Chemie GmbH.

Examples of the levelling agents containing a fluorine-atom-containing compound as a major component include "MEGAFAC (registered trademark) R-08", "MEGAFAC (registered trademark) R-30", "MEGAFAC (registered trademark) R-90", "MEGAFAC (registered trademark) F-410", "MEGAFAC (registered trademark) F-411", "MEGAFAC (registered trademark) F-443", "MEGAFAC (registered trademark) F-445", "MEGAFAC (registered trademark) F-470", "MEGAFAC (registered trademark) F-471", "MEGAFAC (registered trademark) F-477", "MEGAFAC (registered trademark) F-479", "MEGAFAC (registered trademark) F-482", and "MEGAFAC (registered trademark) F-483" manufactured by DIC Corporation; "SURFLON (registered trademark) S-381", "SURFLON (registered trademark ) S-382", "SURFLON (registered trademark) S-383", "SURFLON (registered trademark) S-393", "SURFLON (registered trademark) SC-101", "SURFLON (registered trademark) SC-105", "SURFLON (registered trademark) KH-40", and "SURFLON (registered trademark) SA-100" manufactured by AGC Seimi Chemical Co., Ltd.; "E1830" and "E5844" manufactured by Daikin Fine Chemical Laboratory Co., Ltd.; and "EFTOP EF301", "EFTOP EF303", "EFTOP EF351", and "EFTOP EF352" manufactured by Mitsubishi Materials Electronic Chemicals Co., Ltd.

When a levelling agent is contained in the liquid crystal cured membrane forming composition, the content thereof is preferably 0.01 parts by mass or more and 5 parts by mass or less, more preferably 0.05 parts by mass or more and 3 parts by mass or less, relative to 100 parts by mass of the content of the polymerizable liquid crystal compound (A). When the content of the levelling agent is within this range, it is easy to make the polymerizable liquid crystal compound (A) be horizontally aligned, and the obtained present liquid crystal cured membrane tends to be more smooth and flat, so that it is preferable. When the content of the levelling agent relative to the polymerizable liquid crystal compound (A) exceeds the aforementioned range, unevenness is liable to be generated in the obtained present liquid crystal cured membrane, so that it is not preferable. Here, the liquid crystal cured membrane forming composition may contain two or more kinds of the levelling agents.

(Polymerizable non-liquid-crystal compound)

The liquid crystal cured membrane forming composition may contain a polymerizable non-liquid-crystal compound. When a polymerizable non-liquid-crystal compound is contained, the crosslinking density of the polymerization reactive sites is enhanced, whereby the strength of an optical anisotropic layer can be improved.

The polymerizable non-liquid-crystal compound preferably has at least one polymerizable group selected from the group consisting of an acryloyl group, a methacryloyl group, and an isocyanate group. More preferably, the polymerizable non-liquid-crystal compound has two or more and ten or less polymerizable groups, still more preferably three or more and eight or less polymerizable groups.

When the liquid crystal cured membrane forming composition contains a polymerizable non-liquid-crystal compound, the content thereof is typically 0.1 parts by mass to 30 parts by mass, preferably 0.5 parts by mass to 10 parts by mass, relative to 100 parts by mass of the polymerizable liquid crystal compound (A).

The viscosity of the liquid crystal cured membrane forming composition is preferably 10 mPa·s or less, more preferably 0.1 to 7 mPa·s.

When the viscosity is within the aforesaid range, unevenness in the membrane thickness of the second application membrane is less likely to be generated.

<Second application membrane>

A second application membrane is formed by applying the liquid crystal cured membrane forming composition onto the long optical alignment membrane.

A method of continuously applying the liquid crystal cured membrane forming composition onto the long optical alignment membrane may be, for example, a method similar to that of applying the optical alignment membrane forming composition.

<Second dried coating membrane>

A second dried coating membrane is formed by drying the second application membrane. In the description of the present application, the second dried coating membrane refers to one in which the content of the solvent in the second application membrane has decreased to be 50 mass % or less. The content of the solvent is preferably 30 mass % or less, more preferably 10 mass % or less, still more preferably 5 mass % or less, and most preferably 1 mass % or less.

The method of drying the second application membrane, the drying temperature, and the drying time may be, for example, similar to those of the first application membrane.

When the polymerizable liquid crystal compound (A) contained in the second dried coating membrane after drying does not form a liquid crystal phase, the liquid crystal phase can be formed by heating the second dried coating membrane up to a temperature at which the polymerizable liquid crystal compound (A) exhibits a liquid crystal phase. The liquid crystal phase may be formed by heating the polymerizable liquid crystal compound (A) contained in the second dried coating membrane to or above a temperature of transition to a solution state and subsequently cooling the polymerizable liquid crystal compound (A) to a temperature at which the polymerizable liquid crystal compound (A) exhibits a liquid crystal phase.

Here, the above drying and the heating for forming the above liquid crystal phase may be carried out through the same heating step.

<Long retardation membrane>

A long retardation membrane is formed by curing the second dried coating membrane.

A retardation membrane has optical functions such as absorption, reflection, diffraction, scattering, refraction, and birefringence. In particular, the retardation membrane is used for converting linearly polarized light into circularly polarized light or elliptically polarized light, or conversely, converting circularly polarized light or elliptically polarized light into linearly polarized light.

To cure is, in other words, to polymerize the polymerizable liquid crystal compound (A) contained in the second dried coating membrane. A polymerizing method may be, for example, a heating method or a method of radiating light, and is preferably a method of radiating light.

It is preferable that the light is radiated directly onto the second dried coating membrane.

Curing is preferably carried out in a state in which the liquid crystal phase is formed in the polymerizable liquid crystal compound (A). The curing may be carried out by radiating light at a temperature at which the liquid crystal phase is exhibited.

The light for radiation of light may be, for example, visible light, ultraviolet light, or laser light. From the viewpoint of facility in handling, ultraviolet light is preferable.

A light source for the radiation of light may be, for example, a xenon lamp, a high-pressure mercury lamp, an ultrahigh-pressure mercury lamp, a metal halide lamp, an ultraviolet ray laser such as KrF or ArF, or the like. Among these, a high-pressure mercury lamp, an ultrahigh-pressure mercury lamp, and a metal halide lamp are preferable. These lamps are preferable because the intensity of light emission of the ultraviolet light having a wavelength of 313 nm is large.

The thickness of the long retardation membrane is typically 3 μm or less, and is preferably within a range of 0.5 μm or more and 3 μm or less, more preferably within a range of 1 μm or more and 3 μm or less. The thickness of the long retardation membrane can be measured by using an interference membrane thickness gauge, a laser microscope, or a contact-type membrane thickness gauge.

Thus, a long circularly polarizing plate is obtained having a long polarizing plate, a long optical alignment membrane, and a long retardation membrane in this order, where the direction of the alignment restricting force of the long optical alignment membrane is oblique relative to the length direction of the long polarizing plate, and the direction of the optical axis of the long retardation membrane is oblique relative to the length direction of the long polarizing plate and parallel to the direction of the optical alignment restricting force.

The direction of the optical axis of the long retardation membrane is preferably 5° to 85°, more preferably 20° to 70°, still more preferably 30° to 60°, and most preferably 45°, relative to the length direction of the long polarizing plate.

The aforesaid circularly polarizing plate preferably has a wavelength dispersion property satisfying the following formulas (1), (2), and (3). By forming a liquid crystal cured membrane from the liquid crystal cured membrane forming composition containing the above compound (A), a long circularly polarizing plate having the aforesaid wavelength dispersion property can be obtained.

$$Re(450)/Re(550) \leq 1.00 \quad (1)$$

$$1.00 \leq Re(650)/Re(550) \quad (2)$$

$$100 < Re(550) < 160 \quad (3)$$

(In the formulas, Re(λ) represents an in-plane retardation value relative to a light having a wavelength of λ nm.)

The wavelength dispersion property of the long circularly polarizing plate can be determined in accordance with the content of the compound (A) contained in the liquid crystal cured membrane forming composition.

Specifically, about two to five kinds of compositions each having a different content of the compound (A) may be prepared; a retardation membrane having the same membrane thickness may be produced from each of the compositions; the retardation value of the obtained retardation membrane may be determined; correlation between the content of the compound (A) and the retardation value of the retardation membrane may be determined from the result thereof; and the content of the compound (A) needed for giving a desired retardation value may be determined from the obtained correlationship.

A pressure-sensitive adhesive layer may be disposed on either surface of the obtained long circularly polarizing plate.

A circularly polarizing plate is obtained by cutting the obtained long circularly polarizing plate into pieces.

Cutting into pieces excludes a case in which the balance between the longer side and the shorter side of the film is considerably extraordinary and, in the description of the present application, a form of "pieces" refers to a case in which the length of the longer side is five times or less as large as the length of the shorter side.

The cutting can be carried out by an arbitrary method.

<Method for continuously producing a long circularly polarizing plate>

The long circularly polarizing plate of the present invention is preferably produced continuously in a roll-to-roll form. With reference to FIG. 1, an essential part of the method for continuously producing a long circularly polarizing plate in a roll-to-roll form will be described.

A first roll 210 in which a long polarizing plate is taken up on a first roll core 210A may be commercially available.

Subsequently, the long polarizing plate is paid out from the first roll 210. The method of paying out the long polarizing plate is carried out by placing a suitable rotation means on the roll core 210A of the first roll 210 and rotating the first roll 210 by the rotation means. Also, a method may be adopted in which a suitable auxiliary roll 300 is placed in a direction of transporting the long polarizing plate from the first roll 210, and the long polarizing plate is paid out by a rotation means of the auxiliary roll 300. Further, a method may be adopted in which a rotation means is placed on both of the first roll core 210A and the auxiliary roll 300, whereby the long polarizing plate is paid out while a suitable tension is being imparted to the long polarizing plate.

The long polarizing plate paid out from the first roll 210 is subjected to application of the optical alignment membrane forming composition by an application apparatus 211A on the surface thereof when passing through the application apparatus 211A. The application apparatus 211A for continuously applying the optical alignment membrane forming composition in this manner is preferably in accordance with the gravure coating method, the die coating method, or the flexo method.

The long polarizing plate on which the first application membrane has been formed by passing through the application apparatus 211A is transported to a drying furnace 212A, and the first application membrane is dried by the drying furnace 212A to form a first dried coating membrane. As the drying furnace 212A, a hot-air type drying furnace obtained by combination of the air drying method and the heated drying method is used, for example. The set temperature of the drying furnace 212A is determined in accordance with the kind of the solvent contained in the optical alignment membrane forming composition or the like. Also, the drying furnace 212A may be made of a plurality of zones having set temperatures that are different from each other, or may be a series connection of a plurality of drying furnaces having set temperatures that are different from each other.

Figure 2:
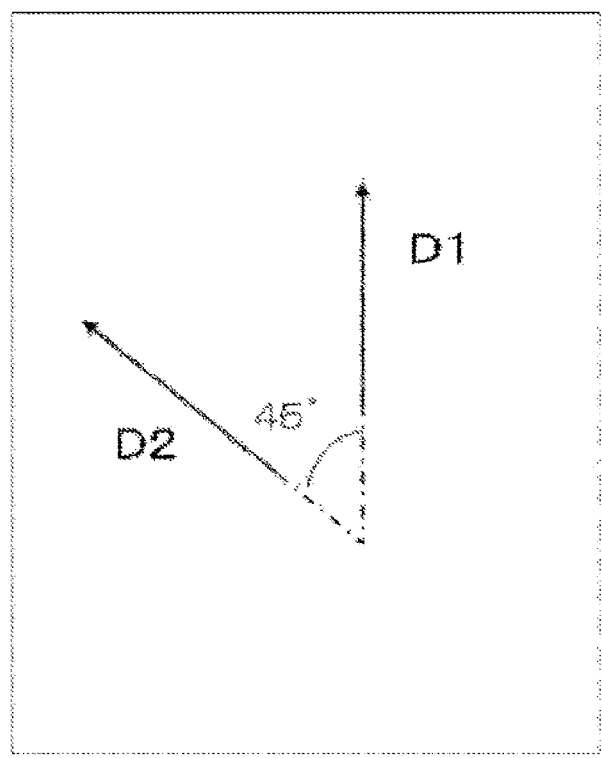
FIG. 2 is a model view illustrating a relationship between a direction D2 of an alignment restricting force of an optical alignment membrane and a length direction D1 of a long polarizing plate.

A long optical alignment membrane is obtained by radiating polarized light onto the obtained first dried coating membrane by a polarized light radiating apparatus 213A. At this time, the polarized light is radiated so that the direction D2 of the alignment restricting force of the optical alignment membrane will be oblique relative to the length direction D1 of the long polarizing plate. FIG. 2 is a model view illustrating a case in which the relationship between the direction D2 of the alignment restricting force of the optical alignment membrane formed after the polarized light radiation and the length direction D1 of the long polarizing plate is 45°. In other words, FIG. 2 shows that the angle formed by the length direction D1 of the long polarizing plate and the direction D2 of the alignment restricting force of the long optical alignment membrane is 45° when the surface of the long optical alignment membrane after passing through the polarized light radiating apparatus 213A is viewed.

Subsequently, the long polarizing plate on which the long optical alignment membrane has been formed passes through an application apparatus 211B. By the application apparatus 211B, a liquid crystal cured membrane forming composition is applied onto the long optical alignment membrane, so as to form a second application membrane. Thereafter, the long polarizing plate is passed through a drying furnace 212B to form a second dried coating membrane. In the same manner as the drying furnace 212A, the drying furnace 212B may be made of a plurality of zones having set temperatures that are different from each other or may be a series connection of a plurality of drying furnaces having set temperatures that are different from each other.

By passing through the drying furnace 212B, the polymerizable liquid crystal compound (A) contained in the liquid crystal cured membrane forming composition forms a liquid crystal phase. By radiating light with use of a polarized light radiating apparatus 213B in a state in which the polymerizable liquid crystal compound (A) contained in the second dried coating membrane has formed the liquid crystal phase, the polymerizable liquid crystal compound (A) is polymerized while retaining the liquid crystal phase, thereby to form a retardation membrane.

The long circularly polarizing plate thus obtained is taken up by a second roll core 220A, so as to obtain a form of a second roll 220. Here, in taking up, cowinding using a suitable spacer may be carried out.

In this manner, by passage of the long polarizing plate from the first roll 210 through the application apparatus 211A, the drying furnace 212A, the polarized light UV radiating apparatus 213A, the application apparatus 211B, the drying furnace 212B, and the light radiating apparatus 213B in this order, the long circularly polarizing plate can be continuously produced by a roll-to-roll process.

In the production method shown in FIG. 1, a method of continuous production from the long polarizing plate to the long circularly polarizing plate has been shown. Alternatively, however, the long polarizing plate may be passed, for example, from the first roll 210 through the application apparatus 211A, the drying furnace 212A, and the polarized light radiating apparatus 213A in this order and taken up onto a roll core for continuous production of a long alignment film in a roll form, and thereafter, the obtained long alignment film in a roll form may be paid out and passed through the application apparatus 211B, the drying furnace 212B, and the light radiating apparatus 213B in this order, thereby to produce a long circularly polarizing plate.

The long circularly polarizing plate of the present invention can be cut in accordance with the needs and used effectively for a display device such as an organic electroluminescence (EL) display device or an inorganic electroluminescence (EL) display device, in particular.

EXAMPLES

Hereafter, the present invention will be described in further more detail by way of Examples. In the Examples, "%" and "part(s)" represent "mass %" and "part(s) by mass", respectively, unless otherwise specified.

Example 1

[Production of optical alignment membrane forming composition]

The following components were mixed, and the obtained mixture was stirred at 80° C. for 1 hour to obtain an optical alignment membrane forming composition (1).

Optical alignment material (5 parts):

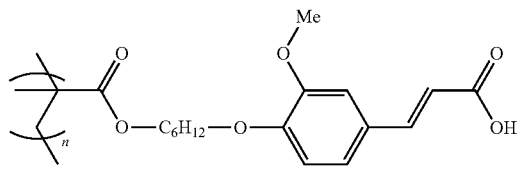

Solvent (95 parts): cyclopentanone

[Production of liquid crystal cured membrane forming Composition]

The following components were mixed and stirred at 80° C. for 1 hour to obtain a liquid crystal cured membrane forming composition (1).

| | |
|---|---:|
| Polymerizable liquid crystal compound (A); compound (A11-1) | 100 parts |
| Polymerizable liquid crystal compound (A); compound (x-1) | 33 parts | x-1

| | |
|---|---:|
| Polymerization initiator; 2-dimethylamino-2-benzyl-1-(4-morpholinophenyl)butane-1-one (Irgacure (registered trademark) 369; manufactured by BASF JAPAN Ltd.) | 8 parts |
| Levelling agent; polyacrylate compound (BYK-361N; manufactured by BYK-Chemie GmbH) | 0.1 parts |
| Other additives; LALOMER LR9000 (manufactured by BASF JAPAN Ltd.) | 6.7 parts |
| Solvent; cyclopentanone | 546 parts |
| Solvent; N-methylpyrrolidone | 364 parts |

[Production of long circularly polarizing plate]

Example 1

The optical alignment membrane forming composition (1) was applied onto a surface of a cycloolefin polymer film plane of a long polarizing plate by the die coating method, thereby to form a first application membrane. The obtained first application membrane was dried at 80° C. for 2 minutes and thereafter cooled to room temperature, thereby to form a first dried coating membrane. Thereafter, polarized ultraviolet light was radiated at 100 mJ (313 nm standard) so that the direction of the alignment restricting force would form an angle of 45° relative to the transportation direction (length direction) of the above long polarizing plate, thereby to form a long optical alignment membrane on the above long polarizing plate. The polarized ultraviolet light was radiated onto the first dried coating membrane in a direction perpendicular to the length direction and the lateral direction of the first dried coating membrane.

Here, as the long polarizing plate, a polarizing plate in which an iodine-dyed polyvinyl alcohol film was interposed between a cycloolefin polymer film (ZF-14, manufactured by ZEON CORPORATION) and a triacetylcellulose film (manufactured by KONICA MINOLTA, INC.) was used.

The liquid crystal cured membrane forming composition (1) was applied onto the long optical alignment membrane by the die coating method to form a second application membrane so that the membrane thickness of the second application membrane would be 17 μm. The second application membrane was subjected to heated drying at 90° C. for 2 minutes and cooled to room temperature to form a second dried coating membrane. Ultraviolet light with an exposure amount of 1000 mJ/cm$^2$ (365 nm standard) was radiated onto the second dried coating membrane by using an ultraviolet light radiating apparatus, thereby to obtain a long circularly polarizing plate (1) having a long retardation membrane formed thereon.

[Membrane thickness measurement]

A film piece (4 cm×4 cm) at an arbitrary site was cut out from the long circularly polarizing plate (1), and the membrane thickness was measured by using a laser microscope (LEXT3000, manufactured by Olympus Corporation). As a result of this, the membrane thickness of the long alignment membrane was 50 nm, and the membrane thickness of the long retardation membrane was 2.1 μm, whereby a thin circularly polarizing plate was obtained.

[Measurement of haze]

A film piece (4 cm×4 cm) at an arbitrary site was cut out from the long circularly polarizing plate (1), and the haze value was measured by using a hazemeter (HZ-2; manufactured by Suga Test Instruments Co., Ltd.). As a result of this, the haze value was 0.4%.

[Measurement of retardation value]

A film piece (4 cm×4 cm) at an arbitrary site was cut out from the long circularly polarizing plate (1), and the front retardation value at a wavelength of 587.7 nm was measured by using a birefringence measuring apparatus (KOBRA-WPR, manufactured by Oji Scientific Instruments), with a result of 149 nm.

Here, the triacetylcellulose film and the cycloolefin polymer film contained in the long polarizing plate do not have a birefringence property. Also, the measured value is a value obtained by removing the birefringence property that the iodine-dyed polyvinyl alcohol film has. Therefore, the measured value represents the front retardation value of the long retardation membrane formed on the long circularly polarizing plate.

[Measurement of wavelength dispersion property]

A film piece (4 cm×4 cm) at an arbitrary site was cut out from the long circularly polarizing plate (1), and the front retardation values at wavelengths of 450.9 nm, 549.4 nm, 587.7 nm, 627.8 nm, and 751.3 nm were measured by using a birefringence measuring apparatus (KOBRA-WPR, manufactured by Oji Scientific Instruments), with a result of 130 nm, 146 nm, 148 nm, 149 nm, and 150 nm, respectively. The front retardation values at wavelengths of 450 nm, 550 nm, and 650 nm, as calculated by Sellmeier fitting, were 133 nm, 143 nm, and 149 nm, respectively. This has confirmed that the following formulas are satisfied.

$Re(450)/Re(550)=0.93\leq 1$ $Re(650)/Re(550)=1.04\geq 1$

[Measurement of reflectivity]

A film piece (4 cm×4 cm) at an arbitrary site was cut out from the long circularly polarizing plate (1), so as to obtain a circularly polarizing plate. The reflectivity of the circularly polarizing plate was measured in the following manner. The surface of the fabricated circularly polarizing plate on the side deriving from the retardation membrane and a reflection plate (mirror surface aluminum plate) were bonded by using a pressure-sensitive adhesive agent, thereby to fabricate a measurement sample.

By using a spectrophotometer (UV-3150 manufactured by Shimadzu Corporation), light having a wavelength within a range of 400 to 700 nm was allowed to be incident at 12° of the normal direction into the measurement sample at a step of 2 nm, and the reflectivity of the reflected light was measured. When comparison was made by assuming that the reflectivity as measured by disposing only the reflection plate without bonding the circularly polarizing plate was 100%, the light within the range of 400 to 700 nm was about 1% to 10% for all of the wavelengths, thereby confirming that a sufficient antireflection property was obtained over the whole visible light region.

Example 2, Reference Example 1

A long circularly polarizing plate (2) (Example 2) and a long circularly polarizing plate (3) (Reference Example 1) were obtained by changing only the drying temperature conditions at the time of fabricating the first dried coating membrane and the second dried coating membrane in an application step similar to that of Example 1.

[Dried coating membrane fabrication conditions]

| | first dried coating membrane fabrication conditions | | second dried coating membrane fabrication conditions | |
|---|---|---|---|---|
| | drying temperature/° C. | drying time/min. | drying temperature/° C. | drying time/min. |
| Example 1 | 80 | 2 | 90 | 2 |
| Example 2 | 80 | 2 | 110 | 2 |
| Reference Example 1 | 120 | 2 | 130 | 2 |

[Hue measurement]

A film piece (4 cm×4 cm) at an arbitrary site was cut out from each of the long circularly polarizing plates (1) to (3) obtained under the conditions of Examples 1 and 2 and Reference Example 1, so as to obtain a circularly polarizing plate. The hue of the polarizing plate was measured in the following manner and obtained by hue conversion. By using a spectrophotometer (UV-3150 manufactured by Shimadzu Corporation), light having a wavelength within a range of 380 nm to 780 nm was allowed to be incident in the normal direction into the measurement sample at a step of 2 nm, so as to measure the transmission spectrum of the fabricated circularly polarizing plate. From the obtained measurement data, the hue a, b of the circularly polarizing plate film was calculated by using a color-matching function.

|  | hue | |
| --- | --- | --- |
|  | a | b |
| Example 1 | −1.5 | 4.1 |
| Example 2 | −2.6 | 6.3 |
| Reference Example 1 | −4.5 | 9.0 |

The long circularly polarizing plates (1) and (2), which had been dried at a temperature lower than 120° C., were less colored than the long circularly polarizing plate (3) and were excellent in hue.

The present invention is useful for producing a thin circularly polarizing plate at a high productivity.

What is claimed is:

1. A method for producing a long circularly polarizing plate, comprising, in this order:
   (1) continuously applying an optical alignment membrane forming composition onto a long polarizing plate to form a first application membrane on the long polarizing plate;
   (2) drying the first application membrane to form a first dried coating membrane;
   (3) radiating a polarized light which is polarized in an oblique direction relative to a length direction of the long polarizing plate, onto the first dried coating membrane, so as to form a long optical alignment membrane in which a direction of an alignment restricting force is oblique relative to the length direction of the long polarizing plate;
   (4) continuously applying onto the long optical alignment membrane a liquid crystal cured membrane forming composition containing a polymerizable liquid crystal compound (A), so as to form a second application membrane on the long optical alignment membrane;
   (5) drying the second application membrane to form a second dried coating membrane; and
   (6) curing the second dried coating membrane to form a long retardation membrane,
   wherein the polymerizable liquid crystal compound (A) is a compound represented by the following formula (A):

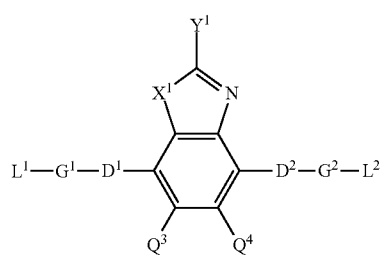

(A)

$X^1$ represents an oxygen atom, a sulfur atom, or $NR^1$-; $R^1$ represents a hydrogen atom or an alkyl group having a carbon number of 1 to 4;

$Y^1$ represents a monovalent aromatic hydrocarbon group having a carbon number of 6 to 12 and optionally having a substituent or a monovalent aromatic heterocyclic group having a carbon number of 3 to 12 and optionally having a substituent;

$Q^3$ and $Q^4$ each independently represent hydrogen atom, a monovalent aliphatic hydrocarbon group having a carbon number of 1 to 20 and optionally having a substituent, a monovalent alicyclic hydrocarbon group having a carbon number of 3 to 20, a monovalent aromatic hydrocarbon group having a carbon number of 6 to 20 and optionally having a substituent, a halogen atom, a cyano group, a nitro group, —$NR^2R^3$, or -$SR^2$, or $Q^3$ and $Q^4$ are bonded with each other to form an aromatic ring or an aromatic heterocyclic ring together with carbon atoms to which these are bonded; $R^2$ and $R^3$ each independently represent a hydrogen atom or an alkyl group having a carbon number of 1 to 6;

$D^1$ and $D^2$ each independently represent a single bond, —C(=O)—O—, —C(=S)—O—, —$CR^4R^5$—, —$CR^4R^5$—$CR^6R^7$—, —O—$CR^4R^5$—, —$CR^4R^5$—O—$CR^6R^7$—, —CO—O—$CR^4R^5$—, —O—CO—$CR^4R^5$—, —$CR^4R^5$—O—, —CO—$CR^6R^7$—, —$CR^4R^5$—CO—O—$CR^6R^7$—, $NR^4$—$CR^5R^6$—, or CO—$NR^4$—;

$R^4$, $R^5$, $R^6$ and $R^7$ each independently represent a hydrogen atom, a fluorine atom, or an alkyl group having a carbon number of 1 to 4;

$G^1$ and $G^2$ each indepndently represent a divalent alicyclic hydrocarbon group having a carbon number of 5 to 8, where a methylene group constituting the alicyclic hydrocarbon group may be substituted with an oxygen atom, a sulfur atom, or NH—, and a methane group constituting the alicyclic hydrocarbon group may be substituted with a tertiary nitrogen atom; and $L^1$ and $L^2$ each independently represent a monovalent organic group, where at least one of $L^1$ and $L^2$ has a polymerizable group.

2. The method for producing a long circularly polarizing plate according to claim 1, wherein a temperature for drying the first application membrane is lower than 120° C.

3. The method for producing a long circularly polarizing plate according to claim 1, wherein a temperature for drying the second application membrane is lower than 120° C.

4. The method for producing a long circularly polarizing plate according to claim 1, wherein the long polarizing plate includes a film obtained by orientation of polyvinyl alcohol dyed with iodine.

5. The method for producing a long circularly polarizing plate according to claim 1, wherein the long polarizing plate includes a film obtained by polymerizing a composition containing a dye and a polymerizable liquid crystal compound (B).

6. The method for producing a long circularly polarizing plate according to claim 5, wherein the polymerizable liquid crystal compound (B) is a polymerizable liquid crystal compound having a smectic liquid crystallinity.

* * * * *